United States Patent
Yamaguchi et al.

(10) Patent No.: US 6,800,168 B2
(45) Date of Patent: *Oct. 5, 2004

(54) BONDING SYSTEM AND METHOD

(75) Inventors: Koji Yamaguchi, Yokohama (JP); Masahiro Nakamura, Saitama (JP); Masahiko Kotoyori, Tokyo (JP); Shinichi Shinohara, Tokyo (JP); Hideo Kobayashi, Tokyo (JP)

(73) Assignee: Origin Electric Company, Limited, Tokyo (JP)

(*) Notice: Subject to any disclaimer, the term of this patent is extended or adjusted under 35 U.S.C. 154(b) by 214 days.

This patent is subject to a terminal disclaimer.

(21) Appl. No.: 10/150,922

(22) Filed: May 21, 2002

(65) Prior Publication Data

US 2002/0134515 A1 Sep. 26, 2002

Related U.S. Application Data

(62) Division of application No. 09/495,472, filed on Feb. 1, 2000, now Pat. No. 6,494,987.

(30) Foreign Application Priority Data

| Feb. 1, 1999 | (JP) | 11-23408 |
| Aug. 20, 1999 | (JP) | 11-234197 |
| Aug. 26, 1999 | (JP) | 11-239508 |
| Sep. 3, 1999 | (JP) | 11-249555 |

(51) Int. Cl.⁷ .............................................. G11B 7/26
(52) U.S. Cl. ................. 156/274.4; 156/106; 156/275.7
(58) Field of Search ................ 156/99, 106, 272.2, 156/274.4, 275.7, 295, 74; 219/603; 369/286; 351/177

(56) References Cited

U.S. PATENT DOCUMENTS

| 4,172,916 A | 10/1979 | Watson |
| 4,205,210 A | 5/1980 | Salway-Waller et al. |
| 4,643,532 A | 2/1987 | Kleiman |
| 5,435,878 A | 7/1995 | Delmar et al. |
| 5,628,860 A | 5/1997 | Shofner et al. |
| 5,743,965 A | 4/1998 | Nishimura et al. |
| 5,938,891 A | 8/1999 | Kashiwagi et al. |
| 6,221,197 B1 | 4/2001 | Mori et al. |
| 6,228,203 B1 | 5/2001 | Kotoyori et al. |
| 6,261,403 B1 | 7/2001 | Gerigk et al. |
| 6,348,119 B1 * | 2/2002 | Leonte et al. ............ 156/273.9 |
| 6,685,794 B2 * | 2/2004 | Shinohara et al. ....... 156/273.1 |

FOREIGN PATENT DOCUMENTS

| EP | 0957478 A1 | 11/1999 |
| JP | 61-235133 | 10/1986 |
| JP | 4-170731 | 6/1992 |
| JP | 4-195942 | 7/1992 |
| JP | 7-228847 | 8/1995 |
| JP | 9-69242 | 3/1997 |
| JP | 9-293282 | 11/1997 |
| JP | 10-312591 | 11/1998 |

* cited by examiner

Primary Examiner—Jeff H. Aftergut
Assistant Examiner—John T. Haran
(74) Attorney, Agent, or Firm—McDermott Will & Emery LLP

(57) ABSTRACT

In a plate bonding system for bonding first and second substrate discs (or other plates) with adhesive, there are provided a first section for bringing the first and second substrate discs closer to each other with the interposition of adhesive, and a second section for producing an electric field in the interspace between the first and second substrate discs. The second section produces the field and thereby deforms the adhesive into a tapered shape to minimize the initial contact area and thereby prevent voids from being involved in the adhesive.

14 Claims, 21 Drawing Sheets

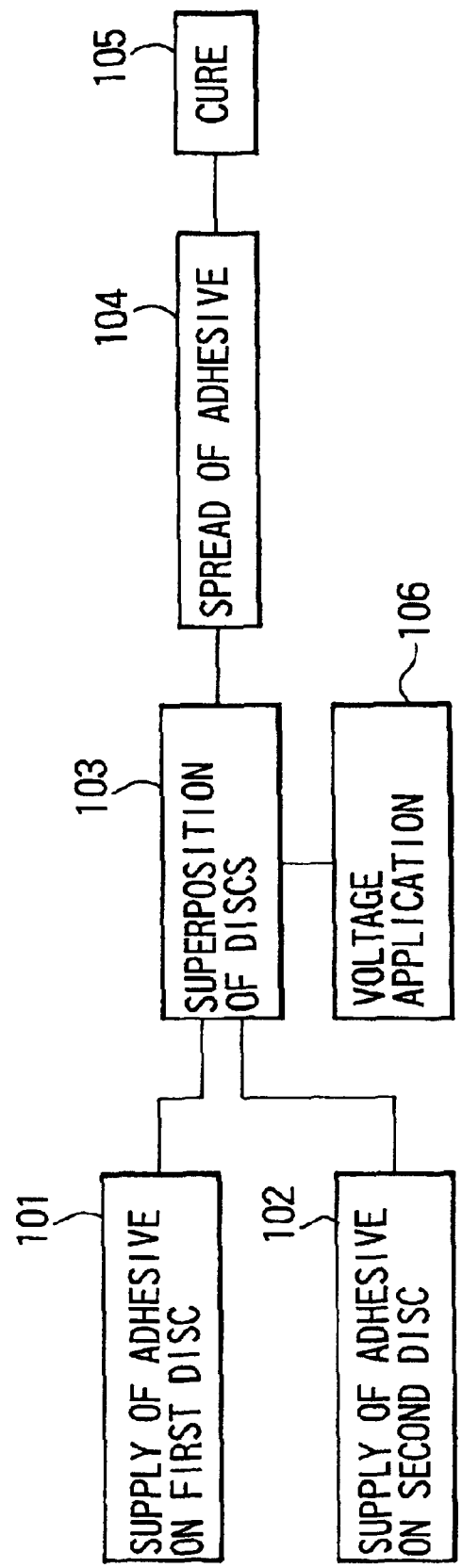

BONDING SYSTEM AND METHOD

This application is a divisional of Application Ser. No. 09/495,472, filed Feb. 1, 2000, now U.S. Pat. No. 6,494,987.

BACKGROUND OF THE INVENTION

The present invention relates to bonding technique of producing multi-layer plates by bonding plates such as optical substrate discs, flat glass plates, curved plates, lenses having curved surfaces or metal plates.

In the disc bonding system using liquid adhesive, prevention of voids (or bubbles) is one of the important problems. In an adhesive layer sandwiched between two substrate discs, there are formed voids, such as voids having diameters of about 0.1 mm or more and minute voids having diameters from 0.05 mm to 0.1 mm in spite of various measures for prevention.

SUMMARY OF THE INVENTION

It is an object of the present invention to provide plate bonding system and method advantageous for avoiding voids from adhesive layers.

According to the present invention, a plate bonding system for producing a bonded plate including first and second substrate plates and an adhesive layer sandwiched between the first and second plates, comprises:

a plate moving member for bringing the first and second plates closer to each other with the interposition of adhesive to produce the bonded plate; and an electric circuit for producing an electric field in an interspace between the first and second plates.

A plate bonding method according to the present invention comprises:

an overlapping step of overlapping first and second plates by bringing the first and second plates closer to each other with the interposition of adhesive to produce the bonded plate; and an electric field producing step of producing an electric field in an interspace between the first and second plates during a period in the overlapping step.

BRIEF DESCRIPTION OF THE DRAWINGS

FIG. 33 is a block diagram schematically showing a bonding system according to the present invention.

DETAILED DESCRIPTION OF THE INVENTION

Figure 1:
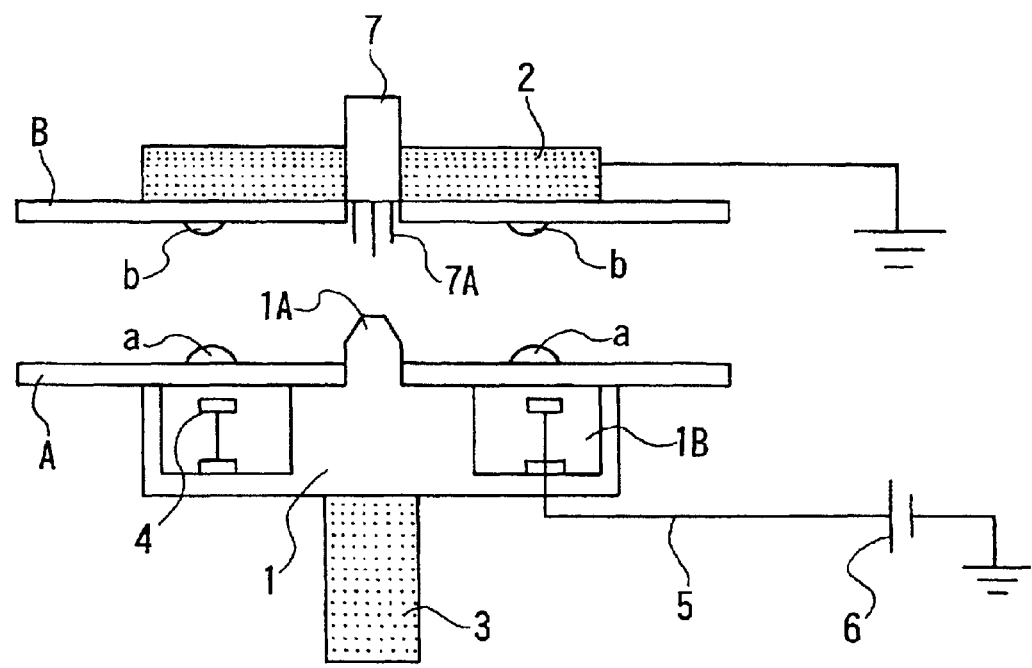
FIG. 1 is a schematic view showing a bonding system in a first practical example according to a first embodiment of the present invention, at a first stage in an operation of overlapping lower and upper substrate discs.

The present invention is based on a notion that the possibility of voids can be reduced by decreasing an initial contact area of adhesive between upper and lower plates, such as upper and lower optical substrate discs, in an overlapping operation of overlapping or superposing the plates on each other. To reduce the initial contact area, the bonding system according to the present invention produces an electric field in the interspace between the upper and lower plates, and thereby to deform the adhesive into a tapered form with the attractive force of the electric field.

The electric field provides electric charges of the opposite polarities, respectively, to the upper and lower plates and the adhesive supplied on at least one of the plates. Combination of these positive and negative charges at the time of contact of the adhesive acts to improve the ability of the adhesive to spread over a plate surface, and thereby further to reduce voids.

The bonding technique according to the present invention is advantageous specifically when applied to the production of digital versatile discs (DVDs) of various types. A single-sided, single-layer DVD disc is a bonded disc including two substrate discs, only one having a recording area of bit string with a reflective layer. A double-sided, single-layer disc has a recording area in each of two substrate discs. A single-sided, dual-layer disc has a reflective layer and a semi-reflective layer. A double-sided, dual-layer disc is a sandwich of two single-sided, dual layer discs. The present invention is applicable to various production processes for producing DVD discs of these types FIGS. 1~9C show a first embodiment of the present invention. FIGS. 1~4 show a plate bonding system in a first practical example according to the first embodiment of the present invention. FIGS. 9A~9C show a plate bonding system in a second practical example according to the first embodiment.

As shown in FIGS. 1~4, a lower optical substrate disc A is placed on a base member (or electrode member) 1, and an upper optical substrate disc B is held by a support member (or electrode member) 2. The lower substrate disc A has a continuous annular adhesive layer a formed on an upward facing bonding surface of the disc A. The upper substrate disc B has a discontinuous annular adhesive layer b formed on a downward facing bonding surface of the disc B. The discontinuous layer b has regularly arranged discontinuities. In this example, the discontinuous layer b is a set of separate adhesive dot regions regularly arranged in an imaginary circle shown by an imaginary line b' in FIG. 5A, around the center of the upper disc B. The continuous layer a is annular around the center of the lower disc A, as shown in FIG. 5B. In this example, the diameter D of the circular center line of the annular adhesive layer a is equal to the diameter of the circle b' on which the centers of the dot regions lie.

The base member 1 has a center shaft 1A projecting upward at the center of the base member 1, and an annular space 1B. The center shaft 1A has a plurality of slits for receiving chuck fingers (or claws) as mentioned later. The base member 1 is fixedly mounted on a lifting shaft 3 extending downward in alignment with the center shaft 1A. The lifting shaft 3 moves up and down together with the base member 1, by being driven by a drive mechanism (not shown in FIGS. 1~4).

A ring-shaped electrode 4 is disposed in the annular space 1B of the base member 1. The ring-shaped electrode 4 is approximately equal in diameter to the annular adhesive layer a formed on the lower substrate disc A. The ring-shaped electrode 4 is located just below the annular adhesive layer a. The electrode 4 is connected through a conductor 5 to a plus terminal of a dc power source 6. A minus terminal of the power source 6 is grounded.

Alternatively, it is optional to connect the minus terminal of the power source 6 with the electrode 4, and the plus terminal to the ground. The voltage of the dc power source 6 is set in a range, lower than a predetermined level, capable of preventing electric discharge between the electrode 4 and the support member 2 in the state in which the adhesive is spread between the lower and upper substrate discs A and B.

The support member 2 for holding the upper substrate disc B is a disc-shaped member of conductive material such as aluminum alloy. The support member 2 has one or more sucking portions for holding the upper disc B by sucking the upward facing surface of the upper disc B. The support member 2 is carried by a transfer arm (not shown), so that the support member 2 can swing horizontally about a vertical axis. The support member 2 is connected through the transfer arm to the ground.

A chucking device 7 is fixed in a center hole of the support member 2. The chucking device 7 has a vertical axis coincident with the axis of the center shaft 1A of the base member 1 in the state of FIG. 1. The chucking device 7 has three fingers 7A capable of expanding and contracting radially under the control of an external control signal. The chucking device 7 can hold the lower disc A by expanding the fingers 7A in the center hole of the lower disc A, and transfer the lower and upper discs in the superposed state, as mentioned later.

This bonding system is operated as follows:

At a predetermined adhesive supplying position, the discontinuous adhesive layer b is formed on the downward facing surface of the upper disc B while supported by the support member 2. The continuous adhesive layer a is formed on the upward facing surface of the lower disc A while placed on the base member 1 at an overlapping position. Then, the upper disc B held by the support member 2 is carried from the adhesive supplying position to the overlapping position shown in FIG. 1, just above the lower disc A, by the transfer arm. At the overlapping position, the adhesive layers a and b are centered so that the dot regions of the discontinuous layer b are arranged on the annular layer a as shown in a plan view of FIG. 6A.

Figure 2:
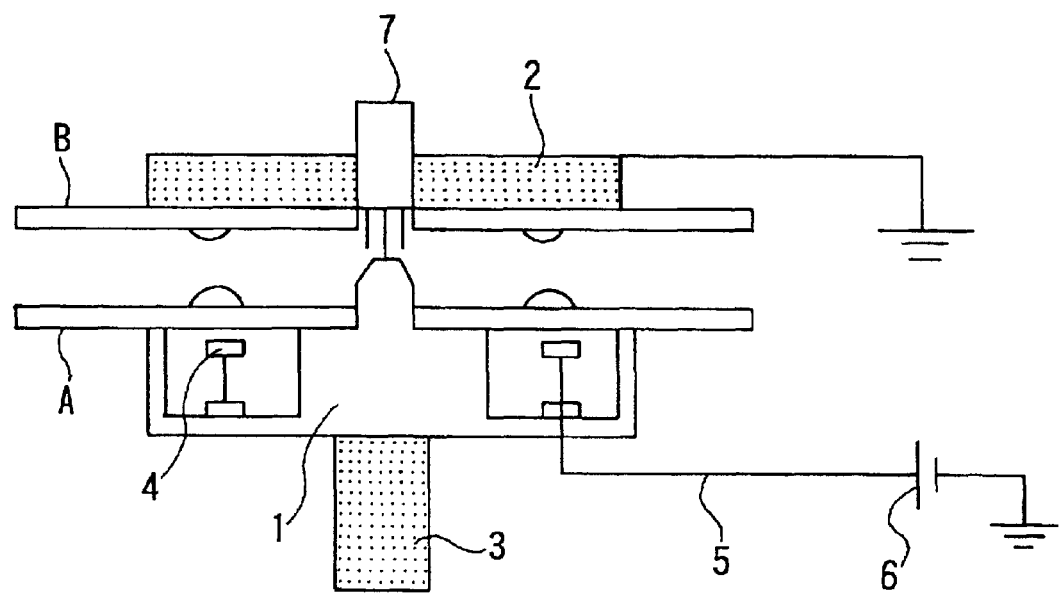
FIG. 2 is a schematic view showing the bonding system of FIG. 1 at a second stage.
Figure 3:
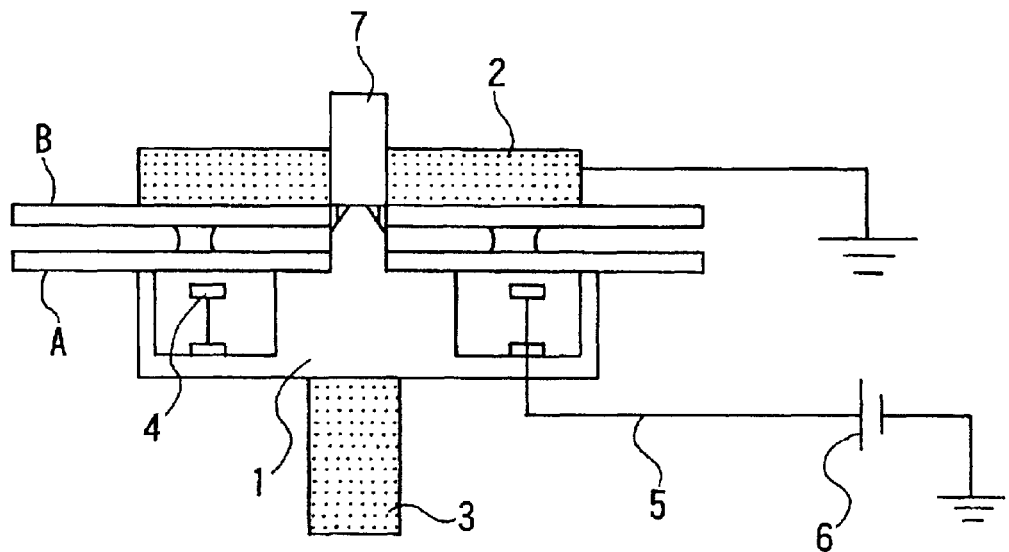
FIG. 3 is a schematic view showing the bonding system of FIG. 1 at a third stage.
Figure 6A:
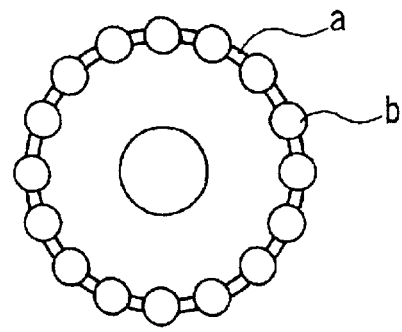
FIGS. 6A~6D are views showing the process of contact between the adhesive layers shown in FIGS. 5A and 5B.
Figure 6B:
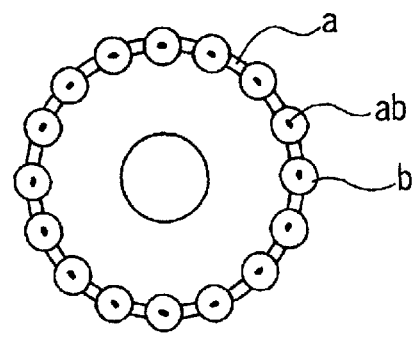

In the state shown in FIG. 1, the voltage of the dc power source 6 is applied between the ring-shaped electrode 4 and the support member 2 so that an electric field is produced in the interspace between the lower and upper substrate discs A and B. Then, as shown in FIG. 2, the base member 1 is moved upward by the lifting shaft 3, and the vertical distance between the lower and upper substrate discs A and B is decreased until the adhesive layers a and b come into contact with each other. In the process of approach and contact between the adhesive layers a and b, the electric field increases as the distance decreases, and causes, with its attractive force, the ridge of the continuous adhesive layer a and the vertexes of the dot regions of the discontinuous adhesive layer b to taper. Therefore, the contact between the adhesive layers a and b begins at the pointed vertexes of the discontinuous adhesive layer with the tapered ridge of the continuous adhesive layer a, so that the initial contact area therebetween at the beginning of the contact can be significantly decreased as compared with the conventional bonding method. FIG. 6B shows the contact points ab between the adhesive layers a and b in the initial stage of the contact.

Figure 6C:
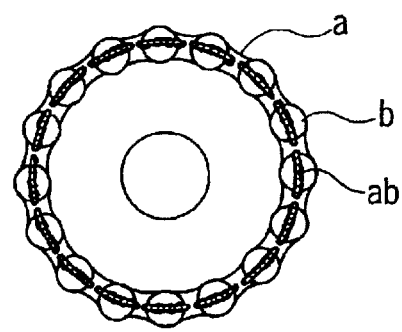
Figure 6D:
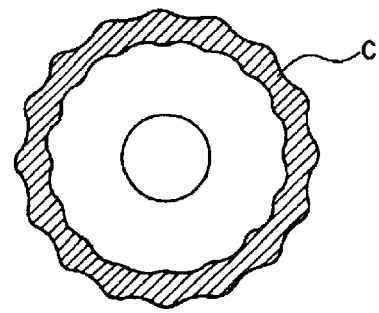

After the contact between the ridge of the annular layer a with the vertexes of the discontinuous layer b, the separate contact regions ab extend rapidly circumferentially along the annular adhesive layer a, as shown in FIG. 6C until the two adhesive layers a and b merge together into an annular adhesive film c, as shown in FIG. 6D. The annular adhesive film c expands radially outwardly or/and inwardly between the bonding surfaces of the lower and upper substrate discs A and B which are positively and negatively charged. Preferably, the ascending speed of the lifting shaft 3 after the beginning of the contact between the layers a and b is controlled to be approximately equal to or slower than a decreasing speed at which the heights of the adhesive layers a and b decrease as the adhesive layers a and b spread. In this case, the adhesive film spreads up to the outer peripheries of the lower and upper discs A and B without the need of a subsequent spinning operation, and it is possible to obtain an adhesive film having a predetermined thickness by controlling the amounts of the adhesive supplied to the lower and upper discs A and B.

Figure 4:
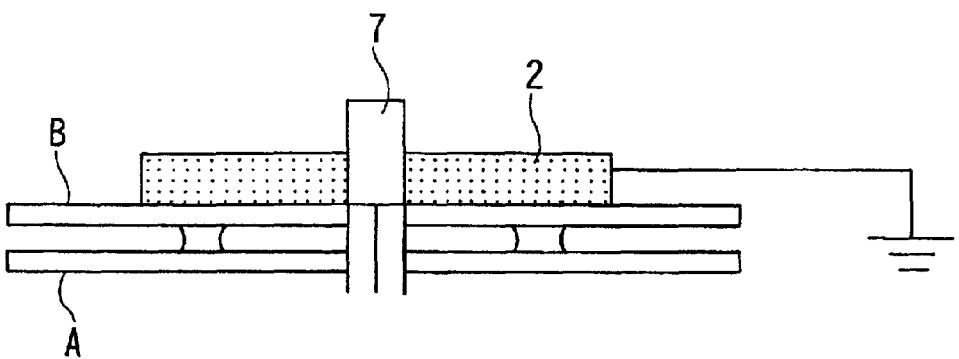
FIG. 4 is a schematic view showing the bonding system of FIG. 1 at a fourth stage.
Figure 4:
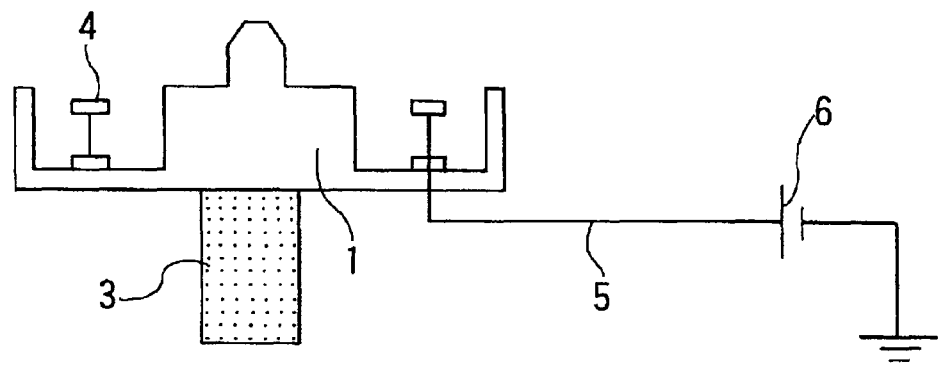
Figure 5A:
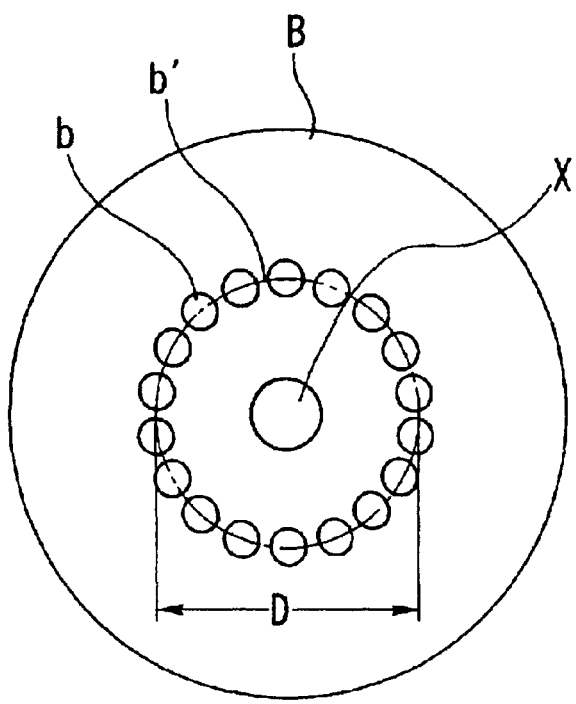
FIGS. 5A and 5B are views showing adhesive layers formed on the upper and lower substrate discs shown in FIG. 1.
Figure 5B:
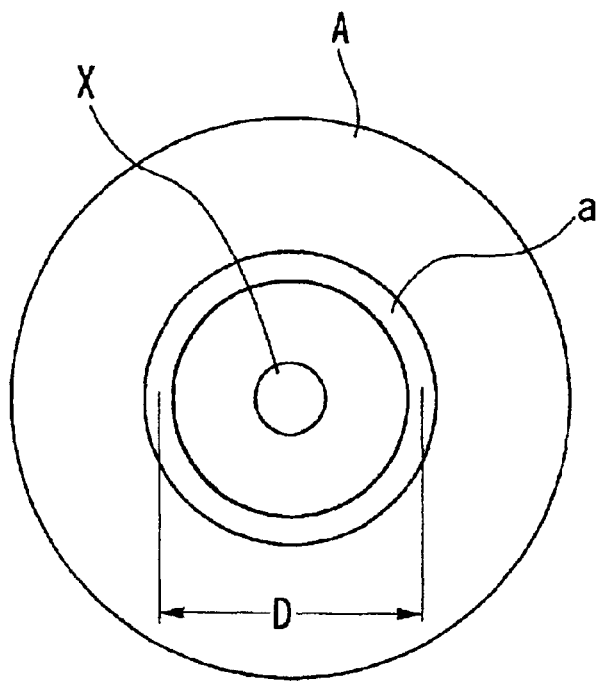

Then, under the control of the external signal, the chucking device 7 expands the fingers 7A in the center holes of the lower and upper discs A and B, and thereby holds the lower and upper discs A and B, as shown in FIG. 4. In this state, the actual liquid adhesive film spreads radially more than depicted, and contains neither minute voids nor larger voids as far as observed through the discs A and B. Thereafter, the lower and upper discs A and B held by the support member 2 in the state shown in FIG. 4 is swung horizontally by the transfer mechanism from the superposing position shown in FIG. 4, to a spinning or spin coating position. At the spinning position, a spinning apparatus (or spinner) spreads the liquid adhesive film and spins off an unwanted amount of the adhesive by the centrifugal force to obtain a uniform film thickness.

In this practical example, the electric field acts to taper the ridge of the continuous adhesive layer a and the vertex of each dot of the discontinuous adhesive layer b, and to cause the contact between the adhesive layers to begin at the tapered and pointed ends. Thus, by minimizing the initial contact area, this bonding system can suppress the occurrence of minute voids sufficiently. After the beginning of the contact, each contact region extends at a fast speed circumferentially along the continuous annular adhesive layer a, and the adhesive spreads radially over the upward facing surface of the lower disc A and the downward facing surface of the upper disc B positively and negatively charged, without involving air in the adhesive film. Therefore, the uniform adhesive film obtained by the spinning operation is free of minute voids and larger voids.

In this example, the diameter D of the discontinuous adhesive layer b is set equal to the diameter of the continuous adhesive layer a. However, it is optional to set one of the adhesive layers slightly greater in diameter than the other. Moreover, it is possible to attain the effects of the present invention even when the adhesive is supplied onto only one of the lower and upper discs.

Figure 7A:
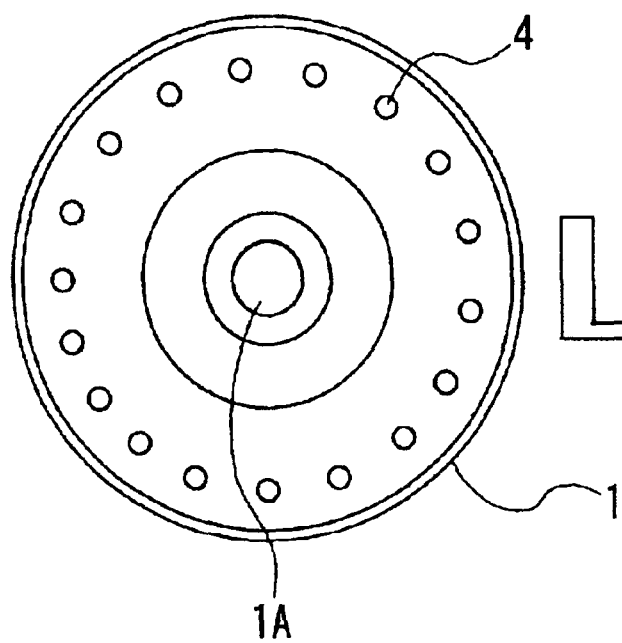
FIGS. 7A and 7B are views showing an arrangement of rods which can be used in place of an electrode 4 shown in FIGS. 1~4.
Figure 7B:
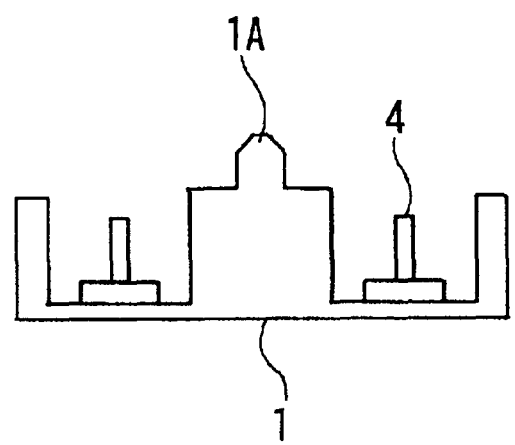
Figure 8A:
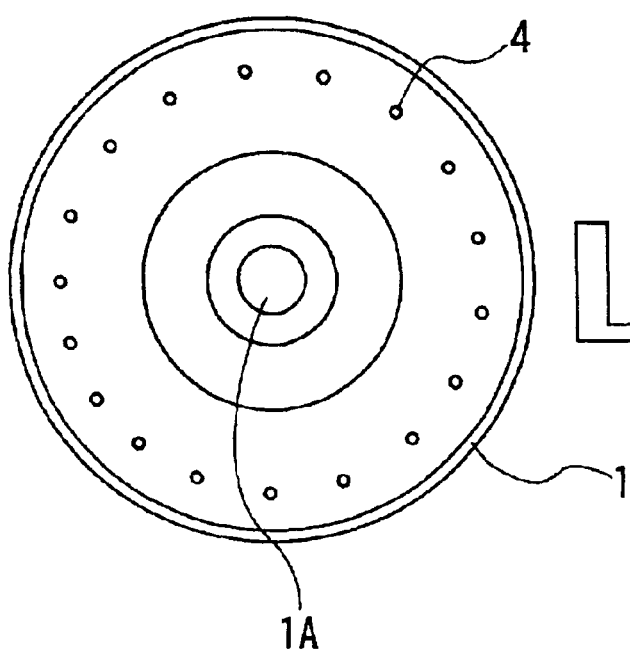
FIGS. 8A and 8B are views showing an arrangement of pins which can be used in place of the electrode 4 shown in FIGS. 1~4.
Figure 8B:
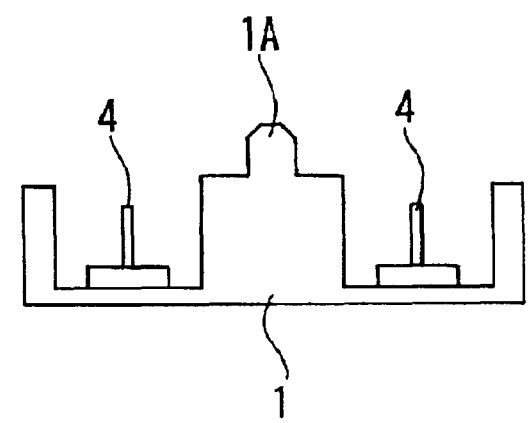
Figure 9A:
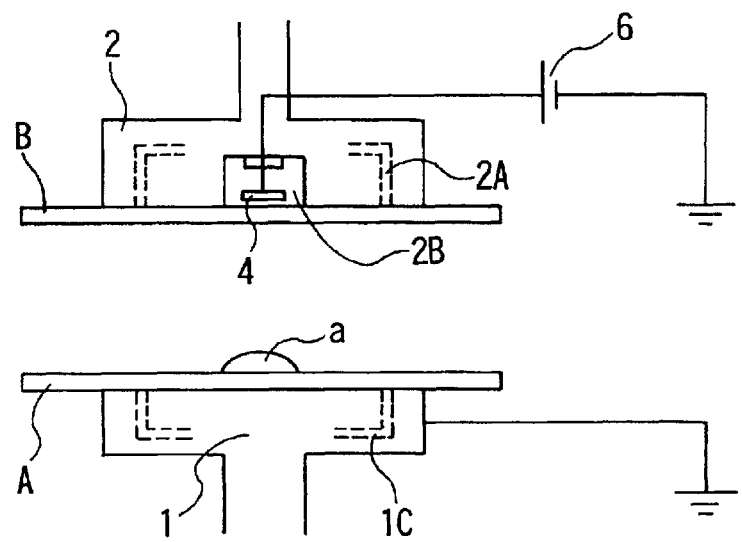
FIGS. 9A~9C are schematic view showing bonding system and method in a second practical example according to the first embodiment.
Figure 9B:
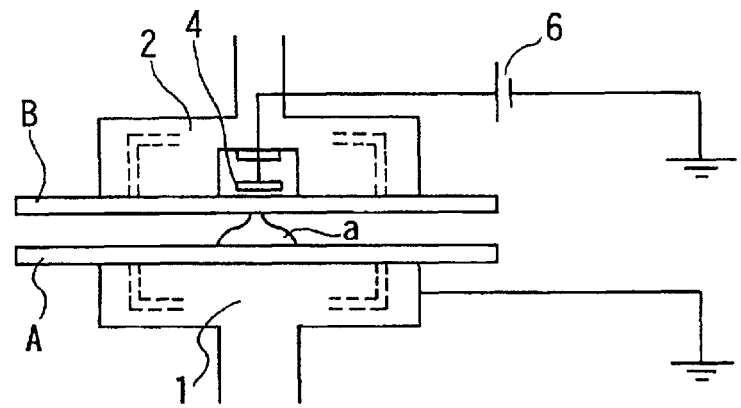
Figure 9C:
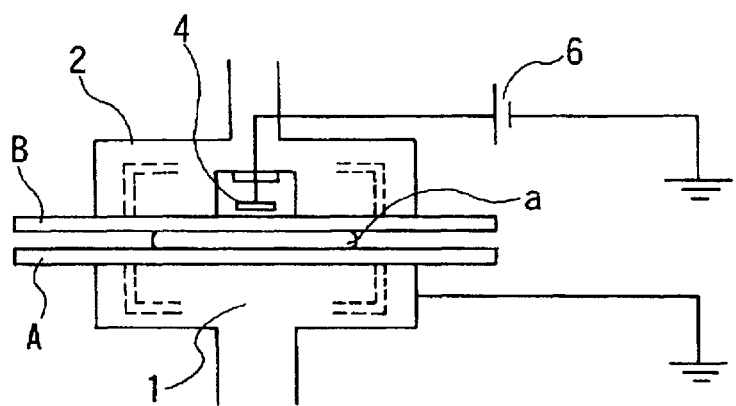

FIGS. 7A, 7B, 8A and 8B show variations of the electrode 4. The electrode 4 shown in FIGS. 1~4 is in the form of a continuous circular ring. Instead, the electrode 4 shown in FIGS. 7A and 7B is a set of upright rods arranged in a circle around the center shaft 1A. Preferably, each rod is positioned just below a unique one of the dots of the discontinuous adhesive layer b formed on the upper disc B, at such a level that the top of each rod is slightly separate below the downward facing surface of the lower disc A without touching the lower disc A on the base member 1. The electrode 4 shown in FIGS. 8A and 8B is a set of upright pins which are arranged in the same manner, but which are smaller in diameter than the rods in the example of FIGS. 7A and 7B.

FIGS. 9A, 9B and 9C show a plate bonding system in a second practical example according to the first embodiment of the present invention. This bonding system is configured to bond two plates, such as flat plates of glass, having no center holes.

The base member 1 of this example is made of metallic material such as stainless alloy, and has an upward facing surface which is similar (in geometrical figure) to the lower (glass) plate A, and smaller in size than the lower plate A. The base member 1 has a plurality of sucking holes regularly arranged in the upward facing surface, and sucking passages 1C connecting the sucking holes to a sucking apparatus (not shown). The base member 1 can hold the lower plate A firmly by suction. The base member 1 is grounded and held at a constant voltage (or potential) substantially equal to zero.

The support member 2 of this example has a downward facing surface which is similar (in geometrical figure) to the upper (glass) plate B, and smaller in size than the upper plate B. The support member 2 has a plurality of sucking holes regularly arranged in the downward facing surface, and sucking passages 2A connecting the sucking holes to a sucking apparatus (not shown). The support member 1 can hold the upper plate B firmly sucked by the downward facing surface. The support member 2 further has a space 2B formed at the center, and an electrode 4 installed in the space 2B. The electrode 4 is connected to a plus terminal of a dc power source 6, whose minus terminal is connected to the ground. The electrode 4 shown in FIGS. 9a~9C has a downward facing flat electrode surface. Instead, the electrode 4 may be in the form of a vertical rod.

In this example, a predetermined amount of liquid adhesive is supplied at the center on the lower plate A. The electrode 4 is positioned just above the drop of adhesive a formed at the center of the lower plate A. This system is arranged to apply a relatively strong electric field to the adhesive drop a just before contact of the adhesive drop a with the downward facing surface of the upper plate B during the process of approach between the lower and upper plates A and B.

As the distance between the lower and upper plates A and B is decreased, the electric field increases and pulls the liquid drop a toward the upper plate B so that the top of the adhesive drop is tapered and pointed, as shown in FIG. 9B. Therefore, the contact begins at the pointed top of the tapered adhesive drop without involving air in the adhesive. Then, the base member 1 is further moved upward, as shown in FIG. 9C, and the adhesive spreads between the lower and upper plates A and B. As the adhesive spreads, charges of the opposite polarities distributed over the confronting surfaces of the lower and upper plates A and B are neutralized, and this neutralization facilitates the void-free spread of adhesive.

It is optional to supply the adhesive only to the upper plate B, or to supply the adhesive to both of the lower and upper plates A and B.

In the present invention, plates (or plate objects) A and B to be bonded may be flat or may be curved. For example, the present invention is applicable for bonding lenses with similar effects. Moreover, the dc power source 6 for producing a dc electric field may be replaced by an ac power source arranged to produce ac electric field.

FIGS. 10–16 show a second embodiment of the present invention. The second embodiment is designed to apply a voltage effectively between reflective films of discs to be bonded to form a bonded optical disc, and to prevent discharge between the discs when brought closer to each other.

Figure 10:
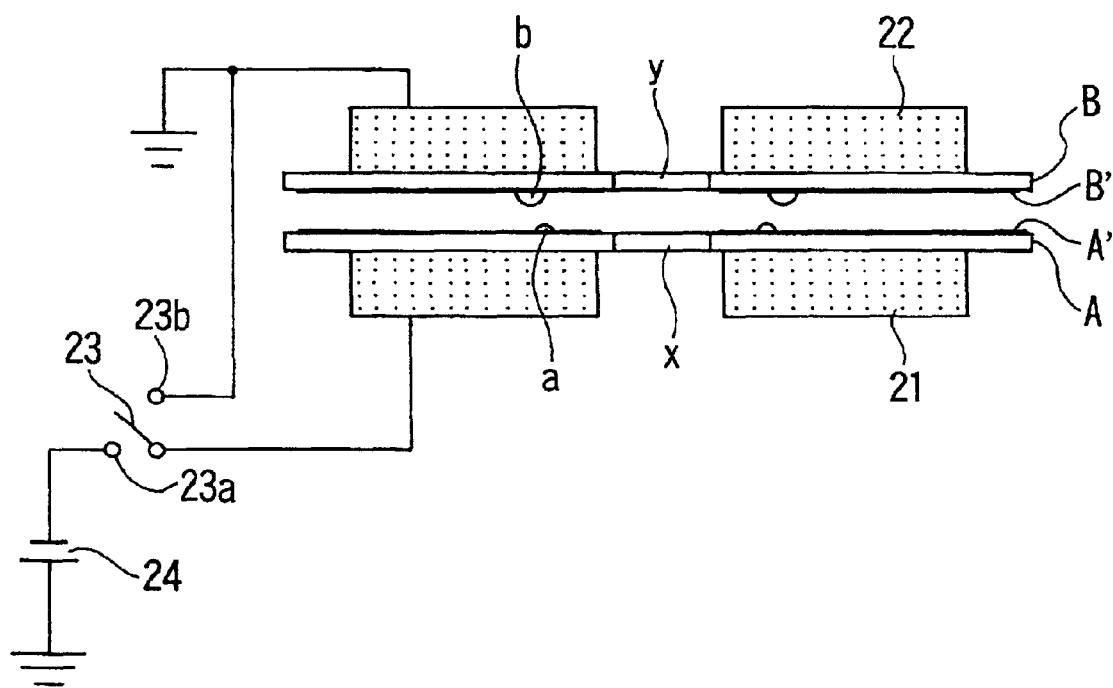
FIG. 10 is a schematic view showing a disc bonding system according to a second embodiment of the present invention.

As shown in FIG. 10, a disc bonding system in one practical example according to the second embodiment has a first electrode 21 and a second electrode 22. The first electrode 21 is a component of a first disc holding member (or base member or electrode member) which serves as a disc holder for holding a lower disc A and as an electrode. The lower disc A is placed on the first electrode 21. The second electrode 22 is a component of a second disc holding member (or support member or electrode member) which also serve as a disc holder for holding an upper disc B and as an electrode. Each of the discs A and B has a recording area and a reflective film A' or B' formed on the recording area. The first and second electrodes 21 and 22 hold the lower and upper discs A and B in a confronted state in which the reflective films of the discs A and B confront each other across an interspace therebetween. Each disc A or B is circular, and has a circular center hole X or Y. The discs A and B of this example are substantially equal in the outside diameter, and substantially equal in the diameter of the center hole. In this example, the reflective film A' or B' of each disc is annular, and bounded between an inner circular periphery having a diameter greater than the diameter of the center hole X or Y, and an outer circular periphery having a diameter smaller than the outside diameter of the disc.

FIG. 10 shows only the first and second electrodes 21 and 22 instead of showing the entireties of the first and second disc holding members. The first and second electrodes 21 and 22 of this example are equal in shape and size. Each electrode 21 or 22 has a smooth flat surface for contacting with a disc. Each electrode 21 or 22 has a plurality of suction holes for sucking a disc, and passages for connecting the suction holes to a suction mechanism.

Figure 12:
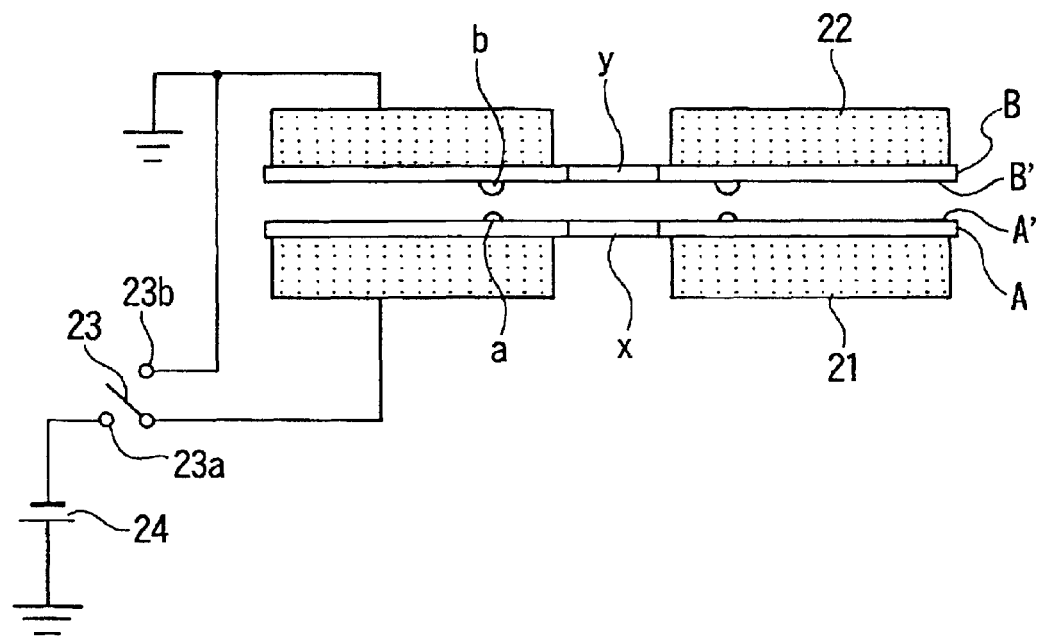
FIG. 12 is a schematic view showing a disc bonding system in another practical example according to the second embodiment.

Each of the first and second electrodes 21 and 22 is annular and has a circular center hole having a diameter which is equal to or greater than the diameter of the center hole X or Y of the disc A or B. The outside diameter of each electrodes 21 or 22 is equal to or smaller than the outside diameter of the reflective film A' or B' of the disc A or B. This range of the electrode size is advantageous for preventing an electric discharge between the first and second electrodes 21 and 22 when both electrodes 21 and 22 are brought to a closest position. The possibility of an electric discharge would be increased if each electrode 21 or 22 had a size not in this range. Moreover, it is desirable not to decrease the area of each electrode 21 or 22 too much as compared with the area of the corresponding reflective film A' or B'. If the area of each electrode 21 or 22 were excessively smaller than the area of the corresponding reflective film A' or B', a stray capacitance between the reflective film A' and the ground would be increased as mentioned later, and the stray capacitance would decrease the effective voltage between the reflective films A' and B' significantly as compared with the voltage applied between the first and second electrodes 21 and 22. Preferably, each electrode 21 or 22 has an inside diameter substantially equal to the inside diameter of the corresponding reflective film A' or B', and an outside diameter substantially equal to the outside diameter of the corresponding reflective film A' or B', as shown in FIG. 12. In this case, the upward facing flat electrode surface of the first electrode 21 is substantially congruent with the reflective film A' of the lower disc A, and the downward facing flat electrode surface of the second electrode 22 is substantially congruent with the reflective film B' of the upper disc B. In the example of FIG. 12, the annular electrode surfaces of the first and second electrodes 21 and 22 and the annular reflective films A' and B' are all substantially congruent, parallel and coaxial with one another.

Figure 11:
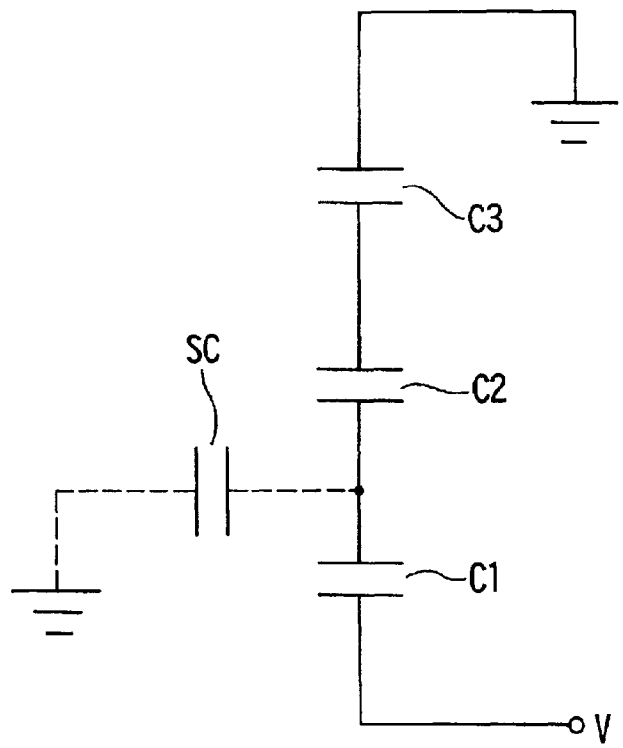
FIG. 11 is an equivalent circuit showing capacitances involved in the bonding system of FIG. 10.

The first electrode 21 of the example shown in FIG. 10 is connected through a switch 23 to a dc power source 24, and the second electrode 22 is fixedly connected to a ground. When the switch 23 is closed to a position for connection with a contact 23a, a dc output voltage V of the power source 24 is applied, through the switch 23, between the first and second electrodes 21 and 22. The first electrode 21 forms a capacitance C1 with the reflective film A' separated from the first electrode 21 by a dielectric layer of the lower disc A. The reflective films A' and B' of the lower and upper discs A and B form a capacitance C2 with the variable interspace therebetween. The second electrode 22 forms a capacitance C3 with the reflective film B' separated from the second electrode 22 by a dielectric layer of the upper disc B. These three capacitances C1, C2 and C3 are connected in series with one another, as shown in FIG. 11.

In practice, there are further formed one or more stray capacitances exerting significant influence on the fractions of the total voltage applied, respectively, on the capacitances C1~C3. A stray capacitance SC shown in FIG. 11 is formed between the reflective film A' and the ground. The stray capacitance SC is connected with the capacitances C1~C3 so that, as the stray capacitance SC increases as compared with the capacitance of the series arrangement of the capacitances C2 and C3, the fraction of the voltage across the capacitance C1 is increased, and the fraction applied to the capacitances C2 and C3 is decreased. Since the capacitance C3 is constant, the voltage applied to the capacitance C2 is decreased as the stray capacitance SC increases. That is, the voltage between the reflective films A' and B' is decreased as the stray capacitance SC increases. As the stray capacitance SC is decreased, the fraction of the source voltage V applied between the reflective films A' and B' is increased. Moreover, the voltage applied across the capacitance C2 is increased as the capacitances C1 and C3 increase.

The congruent first electrode 21 in the example shown in FIG. 12 substantially congruent with the reflective film A' is advantageous for decreasing the stray capacitance SC. This congruent configuration of the first electrode 21 can decrease the stray capacitance SC to a negligible value as compared with the values of the capacitances C2 and C3, and maximize the fraction of the voltage V applied across the capacitance C2.

A stray capacitance formed between the reflective film B' and the ground acts to increase the fraction of the voltage. However, it is difficult to determine the value of this stray capacitance in the design, so that this stray capacitance is disregarded in this example. Accordingly, the second electrode 22 may be smaller in size than the first electrode 21.

The first electrode 21 is made smaller in the outside diameter than the reflective film A' when it is difficult to make the first electrode 21 congruent to the reflective film A' because of the layout of a nearby mechanism such as a transfer mechanism. In this case, it is preferable to make the first electrode 21 similar to the reflective film A' and to make the outside diameter of the first electrode 21 as large as possible. In this example, the first electrode 21 having the flat electrode surface is preferable to pin-shaped or rod-shaped electrodes in that the flat electrode surface having a larger area can decrease the stray capacitance SC. The flat electrode 21 may be a relatively thick annular conductive disc having a flat upward facing electrode surface or a metal film formed on an insulating annular disc.

In this example, an annular adhesive layer a is formed on the lower disc A and a dotted adhesive layer b is formed on the upper disc B, as shown in FIG. 5.

FIGS. 13~16 show the bonding process performed by this bonding system. The first electrode 21 is fixedly mounted on a center shaft 25 projecting upwards at the center of the first electrode 21. The center shaft 25 has a plurality of grooves for receiving chucking fingers (or claws). The first electrode 21 is fixed on a lifting shaft 26 extending downwards coaxially with the center shaft 25. By being driven by a drive system (not shown), the lifting shaft 26 moves the first electrode 21 up and down. For example, the first electrode 21 of the first disc holding member receives a lower disc A in the process of moving upward from a turn table carrying lower discs.

The first electrode 21 is selectively connected, through a conductor 27 and the switch 23, to the minus terminal of the dc power source 24. The plus terminal of the power source 24 is grounded. The voltage of the dc power source 24 is set at a value which is equal to or greater than a minimum value to deform the forward ends of the liquid adhesive layers a and b into a tapered shape just before the contact between the adhesive layers a and b, and to improve the wettability between the adhesive layers a and b, and which is equal to or lower than a maximum value to prevent a discharge between the first and second electrodes 21 and 22.

The second electrode 22 has a suction device for holding the upper disc B by sucking the upper surface of the upper disc B. A transfer mechanism (not shown) has a transfer arm for rotating the second disc holding member including the second electrode 22 within a predetermined angular range about a predetermined vertical axis. The second electrode 22 is connected, through a conductor in the transfer arm, to the ground.

Figure 13:
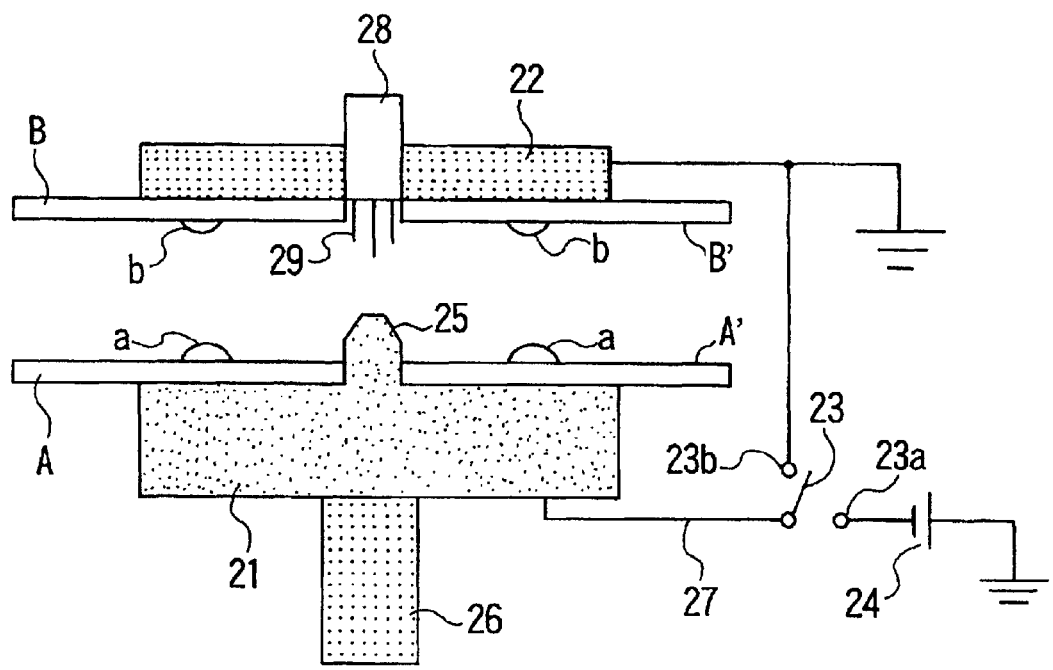
FIG. 13 is a schematic view showing the disc bonding system of FIG. 10 at a first stage of a disc overlapping operation.

The second electrode 22 is fixedly mounted on a chuck device 8 having an axis coincident with the axis of the center shaft 25 of the first disc holding member in the state of FIG. 13. The chuck device 8 is operated under the control of an external signal, and has three chucking fingers (or claws) 9 movable radially away from the axis of the chuck device 8.

The dotted liquid ring b is formed on the downward facing surface of the upper disc B at an adhesive supplying position while the upper disc B is held by the second electrode 22 of the second disc holding member. The continuous liquid ring a is formed on the upward facing surface of the lower disc A while the lower disc A rests on the first electrode 21 of the first disc holding member. Then, the second electrode 22 is moved by the transfer arm to the position just above the first electrode 21 as shown in FIG. 13. The upper electrode 22 is halted at this position.

Figure 14:
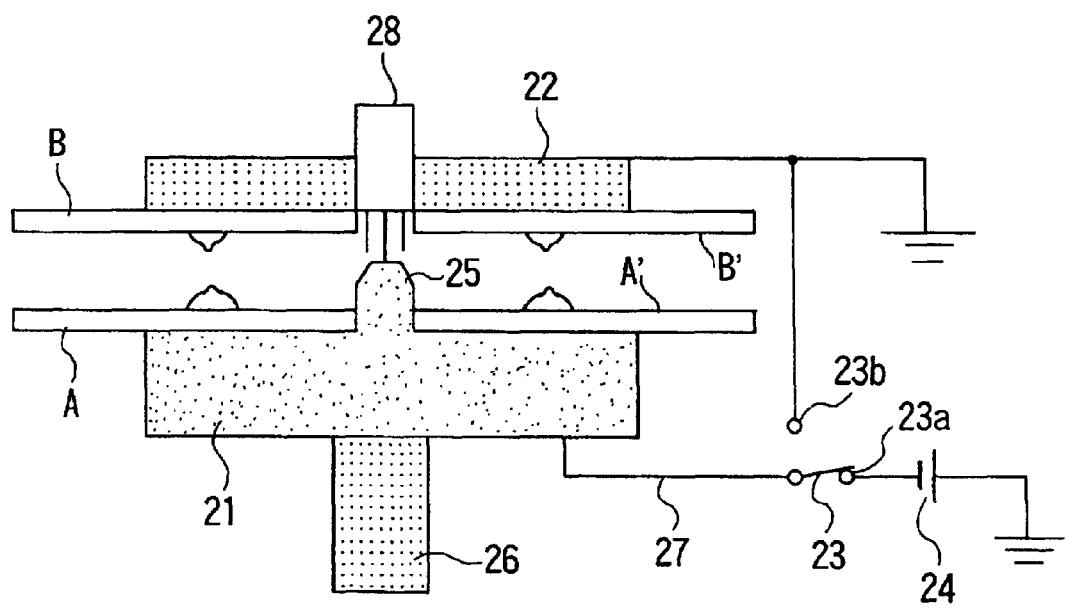
FIG. 14 is a schematic view showing the disc bonding system of FIG. 10 at a second stage of the disc overlapping operation.

Then, as shown in FIG. 14, the first electrode 21 is moved upwards toward the second electrode 22 by the ascending lifting shaft 26. When the distance between the first and second electrodes 21 and 22 is decreased to a predetermined value (about 20 mm, for example), the switch 23 is closed for connection with the contact 23a, and the voltage V of the dc power source 24 is applied between the first and second electrodes 21 and 22. As a result, a fraction of the voltage V is applied between the reflective films A' and B' of the lower and upper discs A and B, so that an electric field is produced in the space between the reflective films A' and B'.

By the application of voltage, the liquid layers a and b come to have opposite charges, and they are attracted by each other. Therefore, each dot of the dotted adhesive layer b is tapered and pointed toward the layer a, and the layer a is also tapered and sharpened toward the layer b. The electric field is increased as the distance between the first and second electrodes 21 and 22 is reduced. Each dot of the dotted adhesive layer b first touches the sharpened edge of the adhesive layer a with the tip of the dot, so that the initial contact area is significantly reduced.

Figure 15:
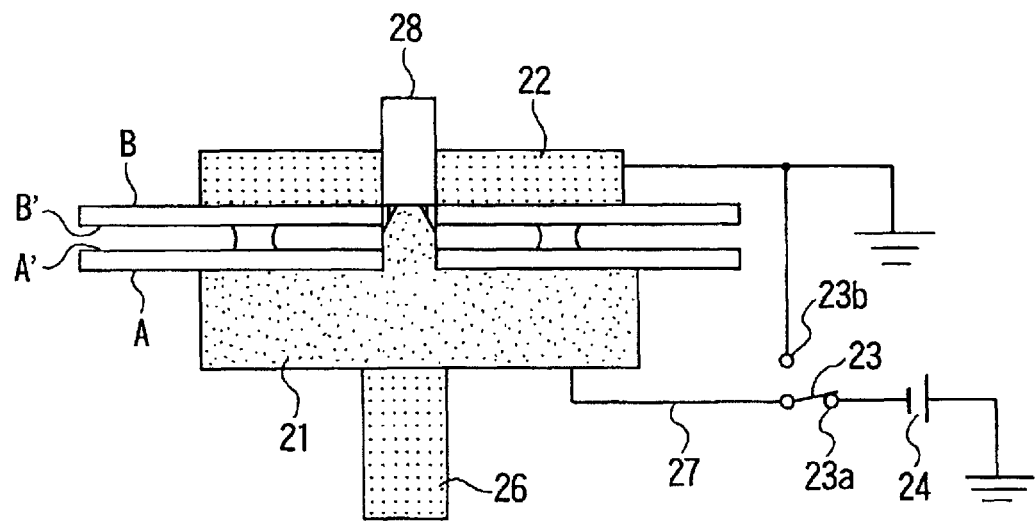
FIG. 15 is a schematic view showing the disc bonding system of FIG. 10 at a third stage of the disc overlapping operation.

After the contact between the tips of the adhesive layer b and the edge of the adhesive layer a, as shown in FIG. 15, the negative and positive charges are neutralized, and the wettability is improved. Each dot of the adhesive layer b extends rapidly along the annular adhesive layer a, and the adhesive layers a and b merge with each other into an annular liquid adhesive film. The annular liquid film spreads radially outward and inward along the upward facing surface of the lower disc A and the downward facing surface of the upper disc B where positive and negative charges remain. In the state shown in FIG. 15, each chucking finger 29 enters the corresponding groove of the center shaft 25.

Figure 16:
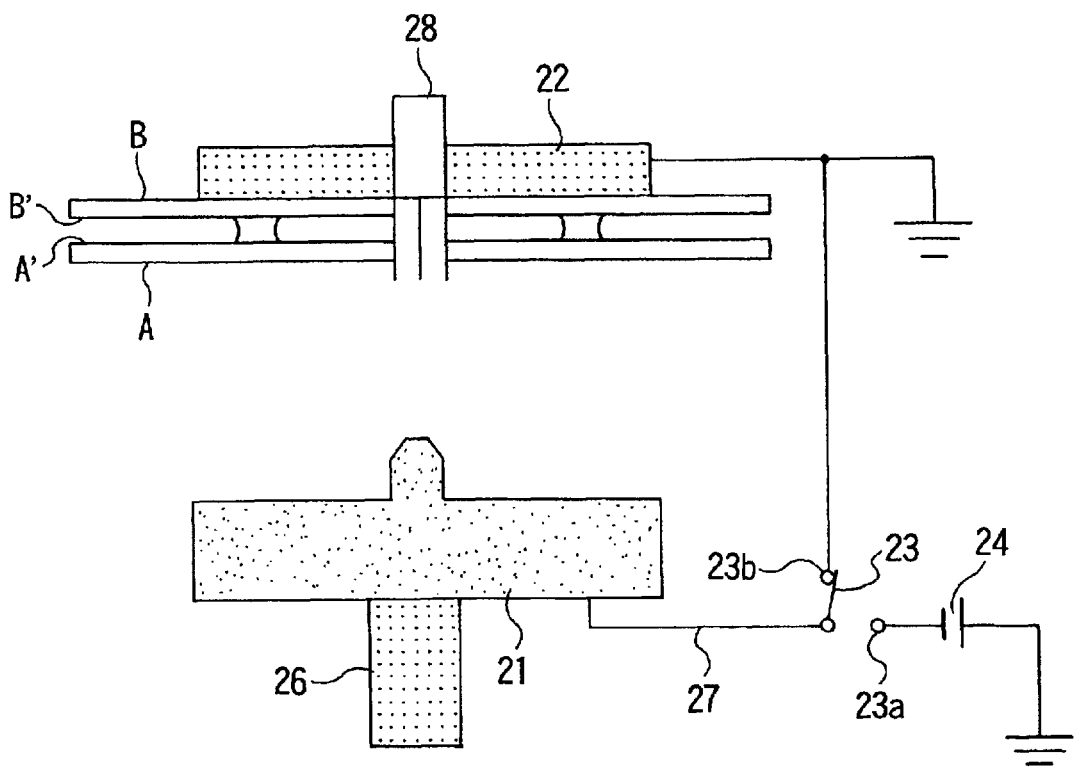
FIG. 16 is a schematic view showing the disc bonding system of FIG. 10 at a fourth stage of the disc overlapping operation.

Then, under the control of an external signal, the chucking device 28 expands the fingers 29 in the center holes X and Y of the lower and upper discs A and B, and thereby holds the lower and upper discs A and B, as shown in FIG. 16. Then, the switch 23 is turned to the point 23b, so that the power source 24 is disconnected, and the first electrode 21 is connected to the ground. After the voltage between the first and second electrodes 21 and 22 is thus reduced substantially to zero, the lifting shaft 26 descends and thereby moves the first electrode 21 downward as shown in FIG. 16. The second disc holding member holds the lower disc A with the chucking device 28 just below the upper disc B. The first and second electrodes 21 and 22 are moved apart after the voltage therebetween is reduced substantially to zero, in order to prevent a discharge which would cause defects in the discs A and B. The voltage across the capacitance C2 between the reflective films A' and B' is reduced to zero by a discharge due to the contact between the adhesive layers a and b. However, in order to discharge the capacitances C1 and C3, the bonding system of this example decreases the voltage of the first electrode 21 to a value substantially equal to zero.

In this state, the actual liquid adhesive film spreads radially more than depicted in FIG. 16, and contains neither minute voids nor larger voids as far as observed through the discs A and B. Thereafter, the lower and upper discs A and B held by the second electrode 22 in the state shown in FIG. 16 is swung horizontally by the transfer mechanism from the superposing position shown in FIG. 16, to the spinning position. At the spinning position, a spinning apparatus spreads the liquid adhesive film and spins off an unwanted amount of the adhesive by a centrifugal force to obtain a uniform film thickness. It is optional to perform the spinning operation at the superposing position for superposing the lower and upper discs A and B with the interposition of the adhesive.

The bonding system according to the second embodiment can reduce the possibility of voids being formed in an adhesive film significantly as in the first embodiment. The diameter D of the discontinuous adhesive layer b may set unequal to the diameter of the continuous adhesive layer a. Moreover, the adhesive may be supplied onto only one of the lower and upper discs. Still another option is to form a first dotted adhesive layer on a lower substrate disc and a second dotted adhesive layer on an upper disc so that one of the dotted adhesive layers has dots densely arranged at regular intervals of a narrower spacing. The first and second electrodes 21 and 22 may be unequal in size and/or different in shape. For example, the electrode on the ground's side can be smaller in size than the other electrode.

The electrode 21 may be a set of an upper section and a lower section, instead of being a single piece. The upper section of the electrode is designed to underlie a substrate disc A, and the lower section is connected with the lifting shaft 26 so that the upper and lower sections move up and down as a unit. In this case, it is easy to make the upper section of the electrode congruent to the reflective film A' of the substrate disc A and thereby reduce the stray capacitance without causing trouble for the conveyance. For example, the system may be so arranged that an upper disc located on a turntable is moved upward together with a substrate disc A and/or that the upper disc is returned to the turntable.

It is optional to omit the switch 44 and instead employ, as the power source 23, a controllable power source capable of providing a dc output voltage having a desired pulse width (or pulse duration). In this case, the circuit is configured to connect the electrode 21 to the ground voltage through capacitor and resistor on the output side of the power source 23 during the period during which the dc output voltage of the power source is substantially null. In the preceding examples, each substrate disc has a reflective film. However, the same effects can be obtained in the same manner in the example in which only one of the two substrate discs has a reflective film.

FIGS. 17~22 show a third embodiment of the present invention. The third embodiment is designed to maintain an effective value of the voltage between reflective films of lower and upper discs for a predetermined time interval.

Figure 17:
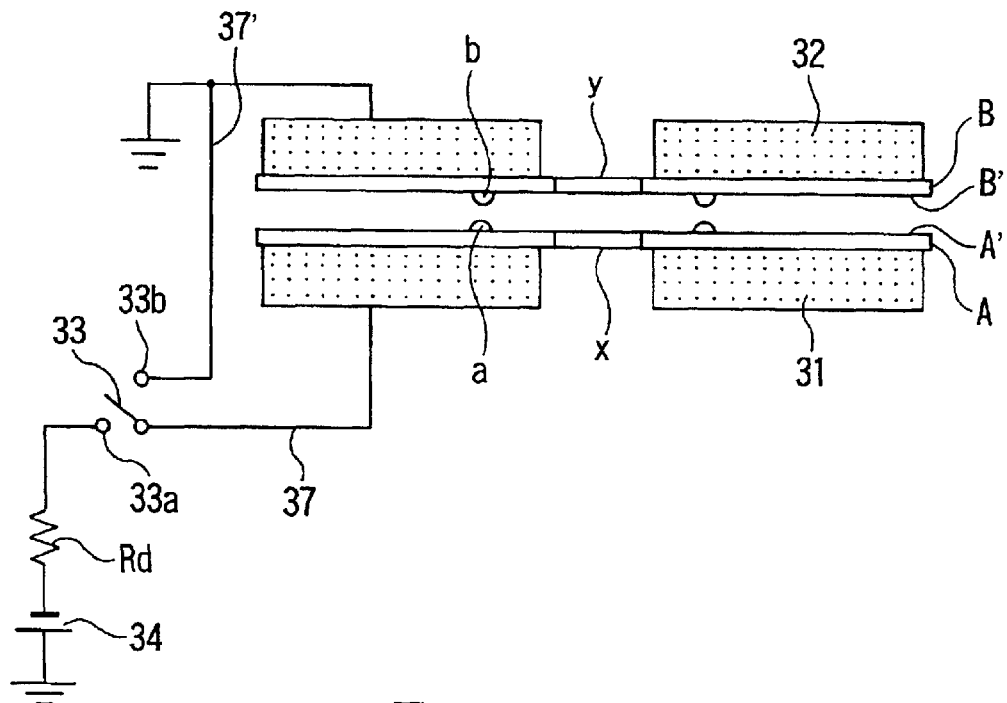
FIG. 17 is a schematic view showing a disc bonding system according to a third embodiment of the present invention.

The disc bonding system shown in FIG. 17 according to the third embodiment is different from the disc bonding system shown in FIG. 12 according to the second embodiment, only in the addition of a resistor Rd. FIGS. 19~22 shows a sequence of steps in the disc bonding process according to the third embodiment. FIGS. 19~22 correspond, respectively, to FIGS. 13~16 of the second embodiment.

Figure 18:
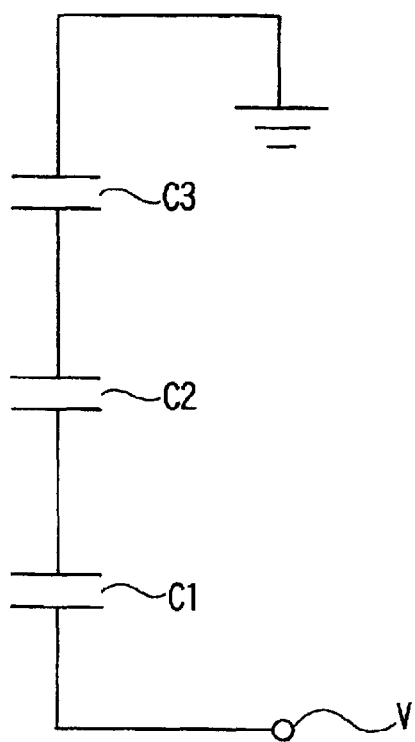
FIG. 18 is an equivalent circuit showing capacitances in the bonding system of FIG. 17.

As shown in FIG. 17, a voltage V of a dc power source 34 is applied between first and second electrodes 31 and 32 through a switch 33 and a resistor Rd. As in the second embodiment, the first electrode 31 forms a capacitance C1 with the reflective film A' separated from the first electrode 31 by a dielectric layer of a lower disc A. Reflective films A' and B' of lower and upper discs A and B form a capacitance C2 with the variable interspace therebetween. The second electrode 32 forms a capacitance C3 with the reflective film B' separated from the second electrode 32 by a dielectric layer of the upper disc B. These three capacitances C1, C2 and C3 are connected in series with one another, as shown in FIG. 18. Each of these capacitances C1~C3 is very small. For example, each of the capacitances C1 and C3 is in the range of 150~200 pF, and the capacitance C2 is about 50 pF just before contact between liquid layers a and b. In the example of FIG. 18, stray capacitances are neglected.

Figure 19:
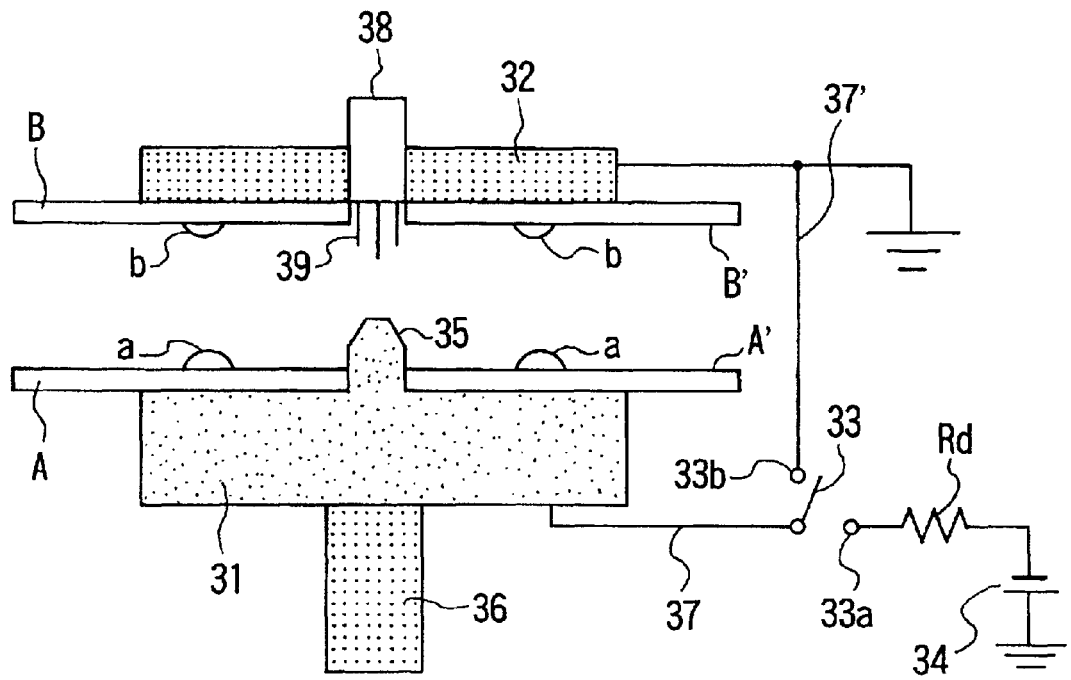
FIG. 19 is a schematic view showing the disc bonding system of FIG. 17 at a first stage of a disc overlapping operation.
Figure 20:
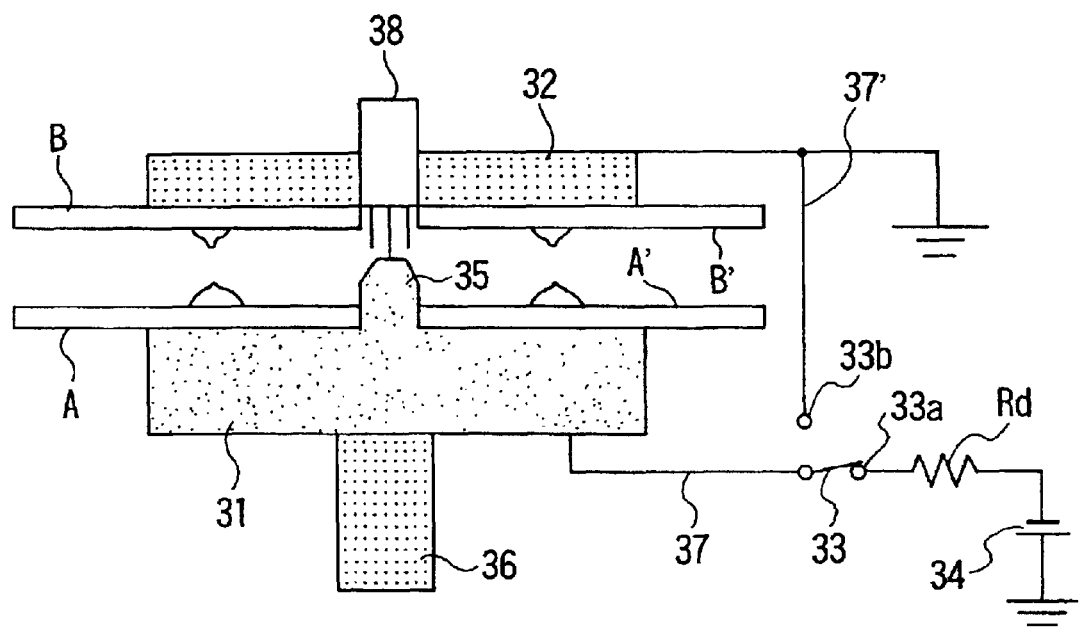
FIG. 20 is a schematic view showing the disc bonding system of FIG. 17 at a second stage of the disc overlapping operation.
Figure 21:
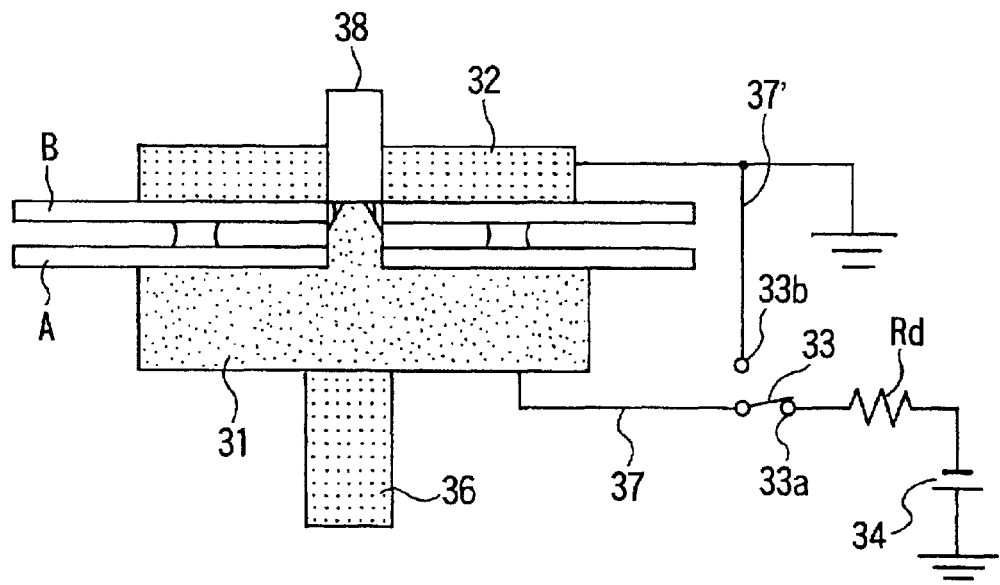
FIG. 21 is a schematic view showing the disc bonding system of FIG. 17 at a third stage of the disc overlapping operation.

The first electrode 31 is moved upward toward the second electrode 32 by a lifting shaft 36 as shown in FIG. 19. When the distance between the first and second electrodes 31 and 32 is decreased to a predetermined value, the switch 33 is closed for connection with a contact 33a, and the voltage V of the dc power source 34 is applied between the first and second electrodes 31 and 32, through the resistor Rd, the closed switch 33 and a conductor 37. As a result, a fraction of the voltage V is applied between the reflective films A' and B' of the lower and upper discs A and B, so that an electric field is produced in the space between the reflective films A' and B'. The interposition of the resistor Rd exerts no or little practical influence on the voltage between the reflective films A' and B' because a current flowing therethrough is very low.

By the application of voltage, the liquid layers a and b attract each other by the action of opposite charges. Therefore, each dot of the dotted adhesive layer b is tapered and pointed toward the layer a, and the layer a is also tapered and sharpened toward the layer b, so that the initial contact area is significantly reduced, as in the preceding embodiments.

It is very difficult to control the superposing operation so that the dots of the adhesive layer b on the upper disc B touch the adhesive layer all at once. In practice, the adhesive dots come into contact with the adhesive layer a at different instants because of irregularity in the heights of the dots, the flatness of discs, and the degree of parallelization between lower and upper discs.

When one or more dots of the adhesive layer b first come into contact with the adhesive layer a at one or more contact points, a current starts flowing through the resistance of the adhesive at the contact point or points, and hence discharge begins in the capacitance C2 between the reflective films A' and B'. Therefore, the voltage V1 between the reflective films A' and B' decreases with a discharge time constant, and becomes lower than a critical voltage V2 that is a minimum voltage required to render the voltage application effective. When the remaining dots of the adhesive layer b touch the adhesive layer a, the voltage application is not effective any more for reducing the contact area sufficiently in contact between the adhesive layers a and b at different contact points since the voltage is lower than V2. The discharge time constant is small because the capacitance C2 is very small though the resistance of the adhesive is as high as several tens MΩ.

In the third embodiment, the discharge time constant is set at a value required to fulfill a condition expressed as T1≦T2. In this condition, T1 is a time from a first instant at which the dotted adhesive layer b first comes into contact with the annular adhesive layer a at one or more contact points (the tips of one or more dots), to a second instant at which all the dots of the dotted layer b come into contact with the annular adhesive layer a, and T2 is a time from the first instant to a third instant at which the voltage V1 between the reflective films A' and B' becomes lower than the critical voltage V2. To achieve the condition of T1≦T2, the resistance of the resistor Rd is set equal to or greater than several tens MΩ, and equal to or lower than 300 MΩ. This range is experimentally determined. The resistor Rd having such a resistance value is connected in a closed circuit including the ground, power source 34, switch 33, and the electrodes 31 and 32. If the resistance is too small, the resistor Rd makes the time T2 too short to prevent voids. The resistor Rd having too great resistance merely decreases the voltage V1 between the reflective films A' and B' sharply, and increases the time constant greatly in the low voltage region below V2, so that the void preventing effect is insufficient.

After the contact between one or more tips of the dotted adhesive layer b and the edge of the adhesive layer a, the capacitance C2 between the reflective films A' and B' is discharged through the resistance of the adhesive whereas the capacitances C1 and C3 are charged by the power source 34 through the resistor Rd, the switch 33 and the ground. The resistor Rd having such a resistance as to achieve the above-mentioned condition, connected in the charging path for C1 and C3 acts to lower the charging rate of the capacitances C1 and C3, and to retard the voltage increase. As a result, the decreasing speed of the voltage between the reflective films becomes slow, and the system can hold the voltage between the reflective films A' and B' equal to or higher than the critical voltage V2 during the period from the first instant at which the dotted adhesive layer b first touches the annular adhesive layer a to the second instant at which all the dots of the dotted layer come into contact with the annular adhesive layer.

Figure 22:
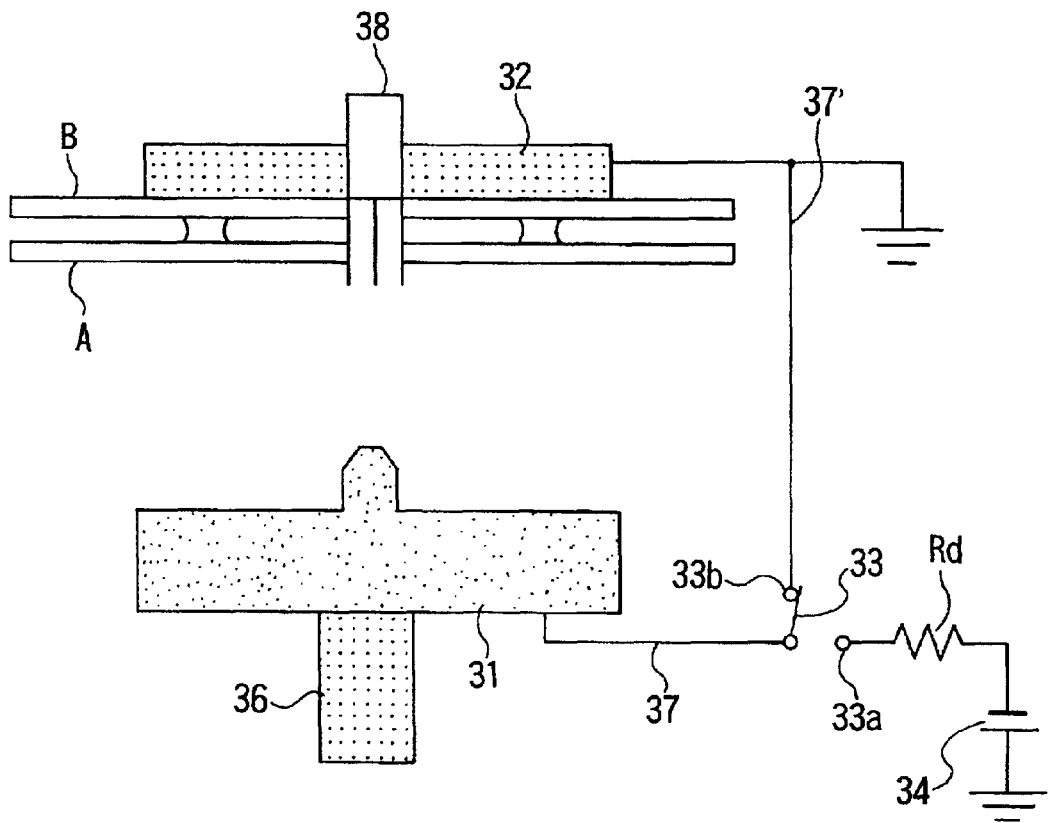
FIG. 22 is a schematic view showing the disc bonding system of FIG. 10 at a fourth stage of the disc overlapping operation.

After the adhesive layers a and b have contacted entirely with each other, the chucking device 38 expands the fingers (or claws) 39 in the center holes X and Y of the lower and upper discs A and B, and thereby holds the lower and upper discs A and B, as shown in FIG. 22. Then, the switch 33 is turned to the point 33b, so that the power source 34 is disconnected, and the first electrode 21 is connected to the ground voltage. After the voltage between the first and second electrodes 21 and 22 is thus reduced substantially to zero, the first electrode 31 is moved downward by the lifting shaft 26. The second disc holding member holds the lower disc A with the chucking device 38 just below the upper disc B.

Thereafter, the lower and upper discs A and B held by the second electrode 22 in the state shown in FIG. 22 is rotated about a predetermined vertical axis by the transfer mechanism from the superposing position shown in FIG. 22, to the spinning position for forming a voidless uniform adhesive film having a predetermined uniform thickness by the centrifugal force.

In the illustrated example, the resistor Rd is used to increase the discharge time constant. Without using a resistor, the same effect can be achieved by making the first and second electrodes 31 and 32 of resistive material having a higher resistance in the above-mentioned resistance range, instead of stainless steel. Examples of resistive materials adequate for this purpose are high resistive polymer resins having appropriate mechanical strength, electrical conductivity and properties adequate for forming operations, and various resins produced by adding or doping conductive material such as metallic particles.

FIGS. 23~30 shows a fourth embodiment of the present invention. The fourth embodiment is designed to apply a relatively low voltage directly to reflective films of lower and upper discs.

Figure 23:
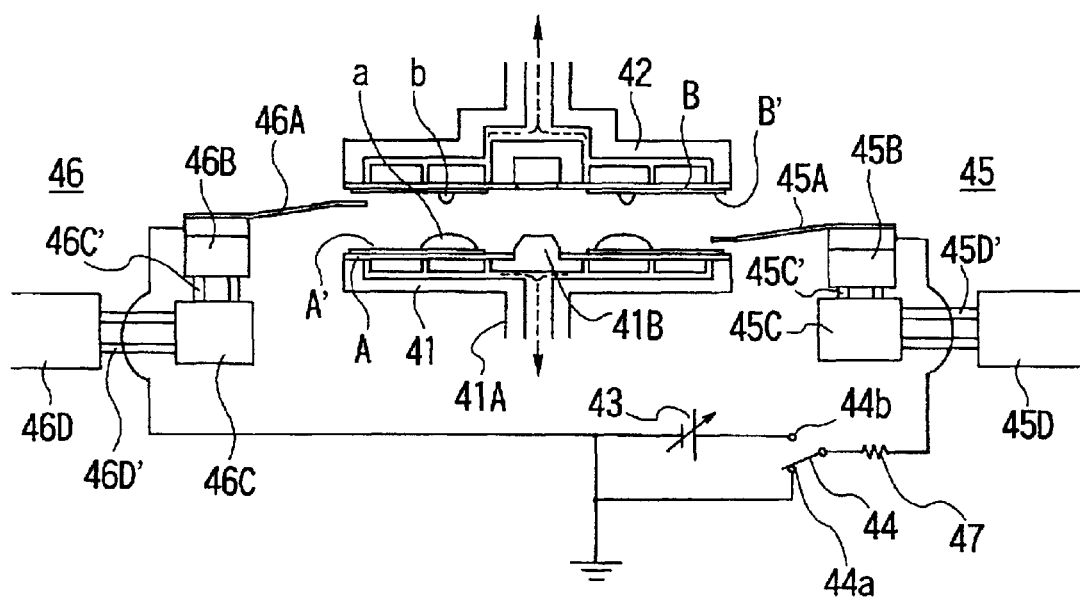
FIG. 23 is a schematic view showing a disc bonding system according to a fourth embodiment of the present invention.

As shown in FIG. 23, a lower disc holding member (or lower suction stage) 41 holds, by vacuum suction, a lower disc A with a reflective film A' facing upward, and an upper disc holding member (or upper suction stage) 42 holds, by vacuum suction, an upper disc B with a reflective film B' facing downward to the lower disc A. The lower disc A has an annular continuous adhesive layer a on the reflective film A', and the upper disc B has an annular dotted adhesive layer b on the reflective film as in the preceding embodiments.

The disc bonding system shown in FIG. 23 further includes a dc power source 43 capable of varying an output voltage, a switch 44 having a ground-side contact 44a, a source-side contact 44b and a movable contact movable therebetween, a voltage applying mechanism 45 for selectively applying a predetermined voltage to the reflective film A' of the lower disc A, a low voltage connecting mechanism 46 for selectively connecting the reflective film B' of the upper disc B to a low voltage such as a ground voltage, and a resistor 47 for preventing a short circuit. The voltage applying mechanism 45 and the low voltage connecting mechanism 46 are substantially identical in construction.

Figure 30:
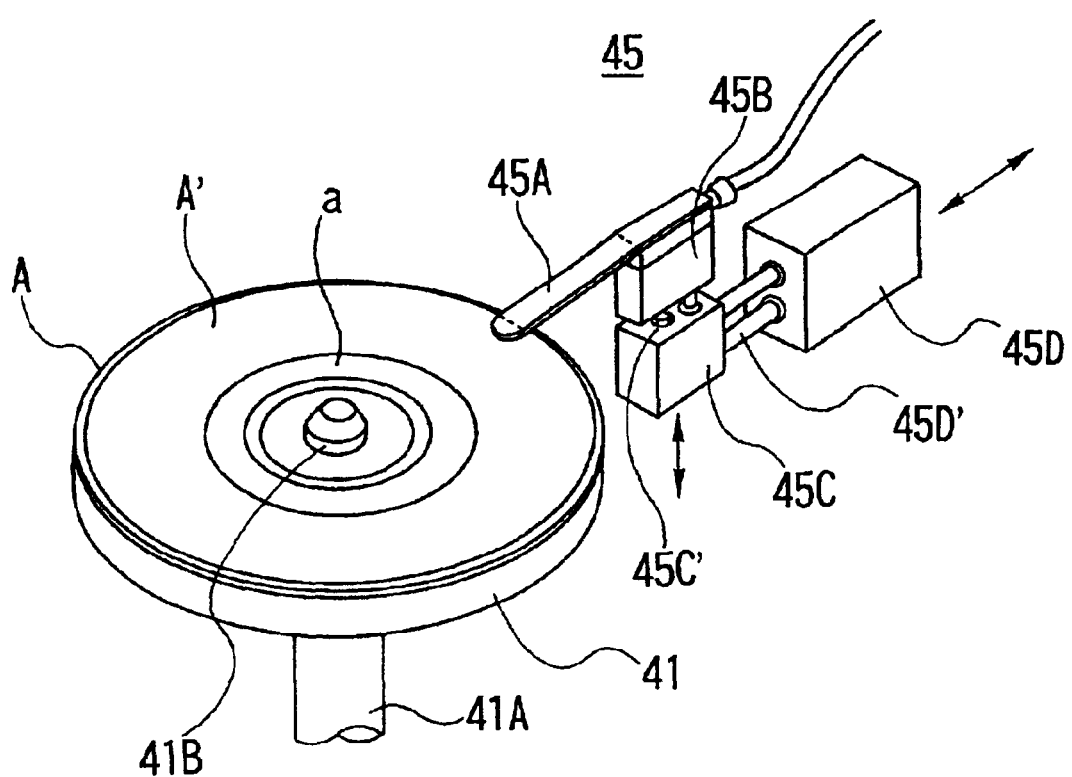
FIG. 30 is a perspective view showing the bonding system of FIG. 23.

Therefore, FIG. 30 shows only the voltage applying mechanism 45, and the following explanation is directed mainly to the voltage applying mechanism 45.

The lower disc holding member 41 is fixedly mounted on a lifting shaft 41 extending downward from the center of the lower surface of the member 41. An upper end 41B of the lifting shaft 41A projects upward at the center of the lower disc holding member 41 and serves as a center shaft for positioning the lower disc A by fitting in the center hole X of the lower disc A. The center shaft 41B has an outside diameter for fitting in the center hole X of the lower disc A.

The voltage applying mechanism 45 includes a conductor 45A arranged to touch the reflective film A' of the lower disc A directly. The conductor 45A serves as a first electrode. The voltage applying mechanism 45 further includes an insulating member 45B supporting the conductor 45A, a vertical drive cylinder 45C for moving the conductor 45A vertically and a horizontal drive cylinder 45D for moving the conductor 45A horizontally. The vertical drive cylinder 45C has vertical cylinder rods 45C' for moving the insulating member 45B to move the conductor 45A vertically. The horizontal drive cylinder 45D has horizontal cylinder rods 45D for moving the vertical cylinder 45C to move the conductor 45A horizontally. In this example, the conductor 45A is a thin strip made of metallic material having elasticity. The conductor 45A has a base end connected to the power source 43, and a tip end for touching, and moving away from, the reflection surface A' of the lower disc A by the action of the vertical and horizontal drive cylinders 45C and 45D.

In the state shown in FIG. 23, the lower and upper discs A and B are held away from each other at a predetermined distance. The conductor 45A is out of contact with the reflection surface A' of the lower disc A, and the conductor 46A is out of contact with the reflection surface B' of the upper disc B. The switch 44 is in an open state for connecting the conductor 45A to the ground through the ground-side contact 44a. No voltage is applied between the reflective films A' and B'.

Figure 24:
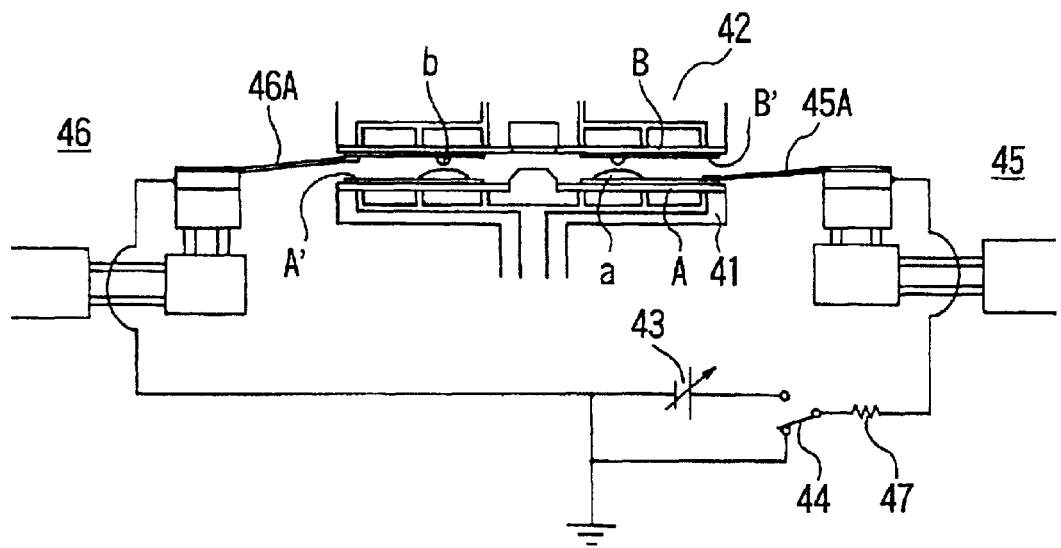
FIG. 24 is a view showing the disc bonding system of FIG. 23 at a second stage of the disc overlapping operation following a first stage shown in FIG. 23.

Then, as shown in FIG. 24, the lifting shaft 41A moves upward to move the lower disc A closer to the upper disc B. When the lower disc A reaches a predetermined level, the reflective film A' touches the tip end of the conductor 45A, and accordingly, the voltage applying mechanism 45 operates the vertical drive cylinder 45C to move the conductor 45A upward substantially at the same speed as the ascending speed of the lower disc A. The low voltage connecting mechanism 46 also operates its vertical drive cylinder 46C to move the conductor 46A upward. The conductor 46A gently touches the reflective film B' of the upper disc B about the same time with the contact of the conductor 45A with the reflective film A', and then the conductor 46A stops the upward movement.

Figure 25:
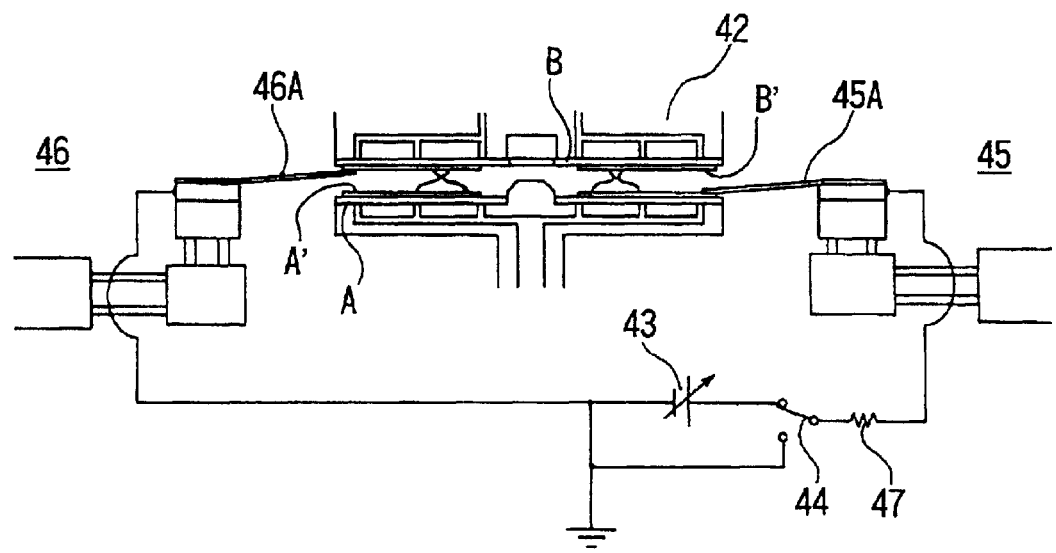
FIG. 25 is a view showing the disc bonding system of FIG. 23 at a third stage of the overlapping operation.

The lifting shaft 41A further moves upward. When the distance between the reflective films A' and B' is decreased to a predetermined value (about 20 mm, for example), the switch 43 is closed, as shown in FIG. 25, and a voltage is applied by the power source 43 through the resistor 47 between the reflective films A' and B'. As a result, an electric field is produced in the space between the reflective films A' and B'. The voltage applied between the reflective films A' and B' is equal to or higher than a minimum value to be effective for tapering the adhesive layers and equal to or lower than a maximum value capable of preventing a discharge. In this example, the applied voltage is in the range of 100~500 V. The short preventing resistor 47 prevents a short circuit by preventing the flow of high current from the power source 43 to the reflective films A' and B' even when the conductors 45A and 46B are erroneously connected directly through the reflective film A' or B'. The resistor 47 has a resistance of several MΩ or several tens MΩ. In this case, the current is little, and the voltage drop across the resistor 7 is not problematical.

It is preferable to start the voltage application before the contact between the dotted adhesive layer b and the annular adhesive layer a, and to terminate the voltage application after all the dots come into contact with the adhesive layer.

Figure 26:
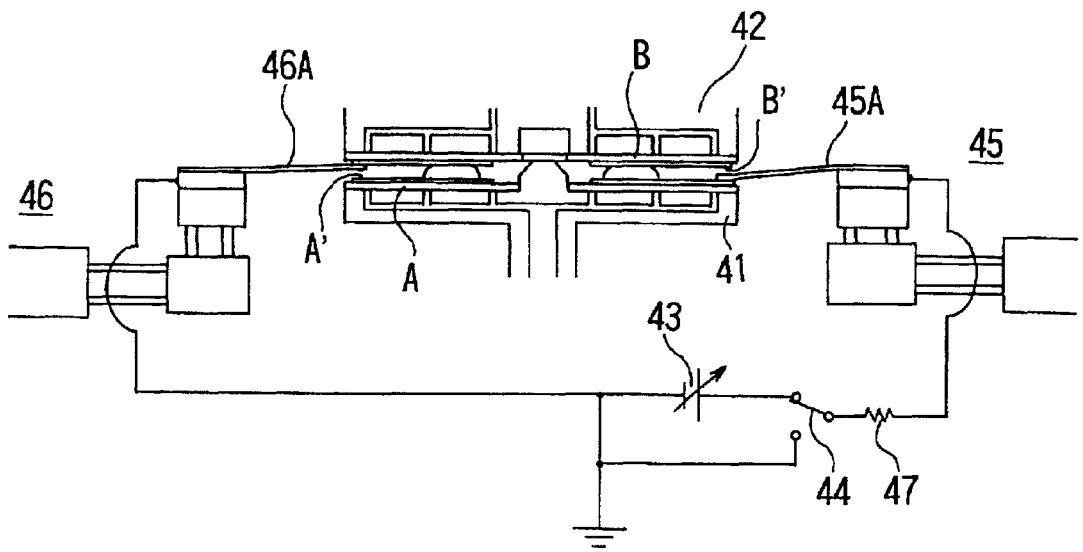
FIG. 26 is a view showing the bonding system at a fourth stage.

After the contact, the contact regions expand, and the adhesive layers a and b merge into a single adhesive layer, as shown in FIG. 26.

Figure 27:
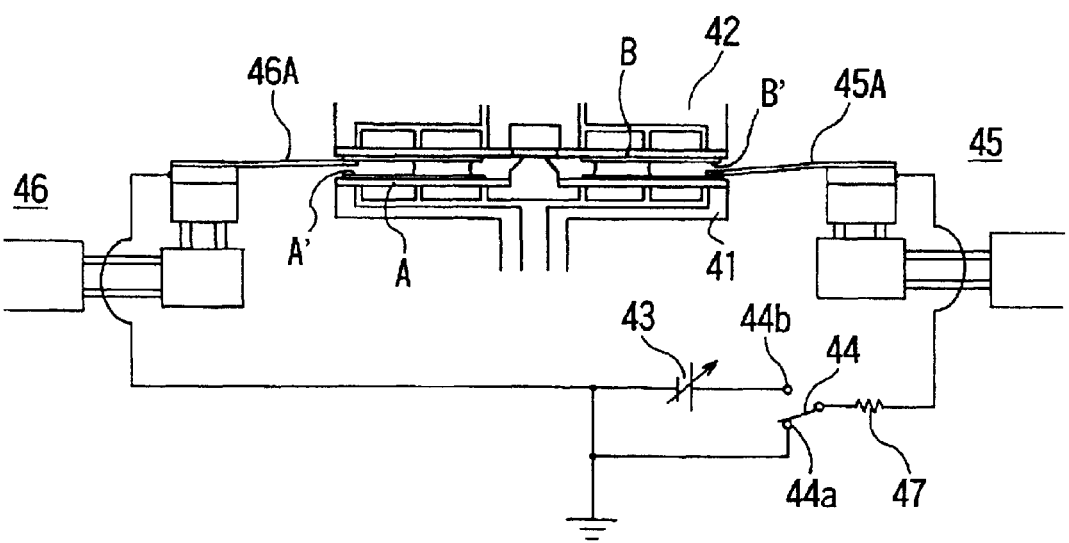
FIG. 27 is a view showing the bonding system of FIG. 23 at a fifth stage.

Then, as shown in FIG. 27, the switch 43 is turned to the ground-side contact 44a, and accordingly the reflective film A' of the lower disc A is connected to the ground through the conductor 45A, the switch 44 and the resistor 47. The conductor 45A is brought to a low voltage state nearly equal to 0 volt.

Figure 28:
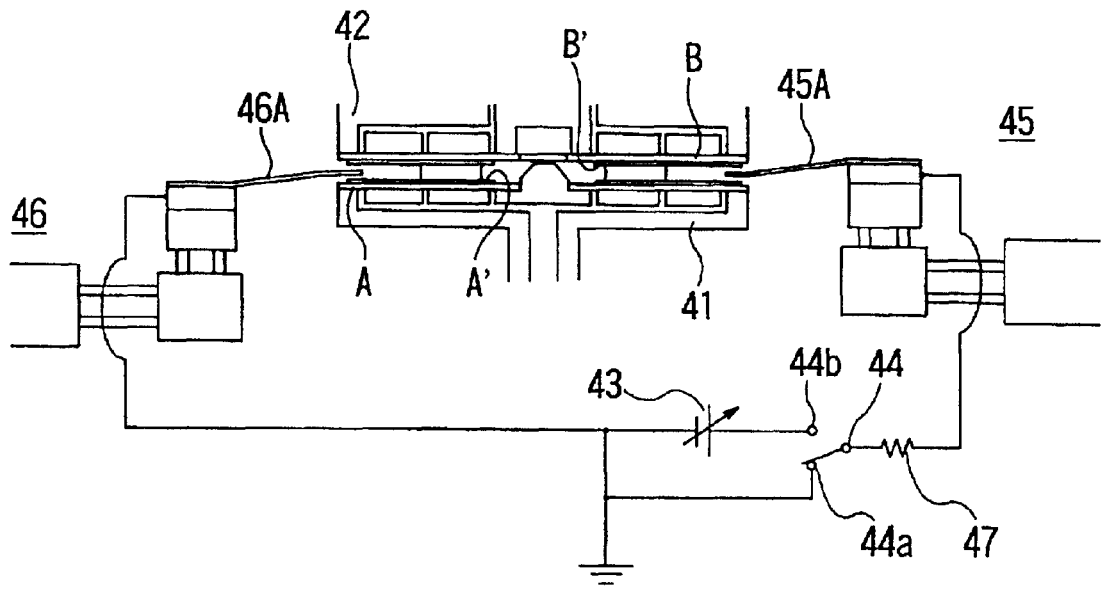
FIG. 28 is a view showing the bonding system of FIG. 23 at a sixth stage.
Figure 29:
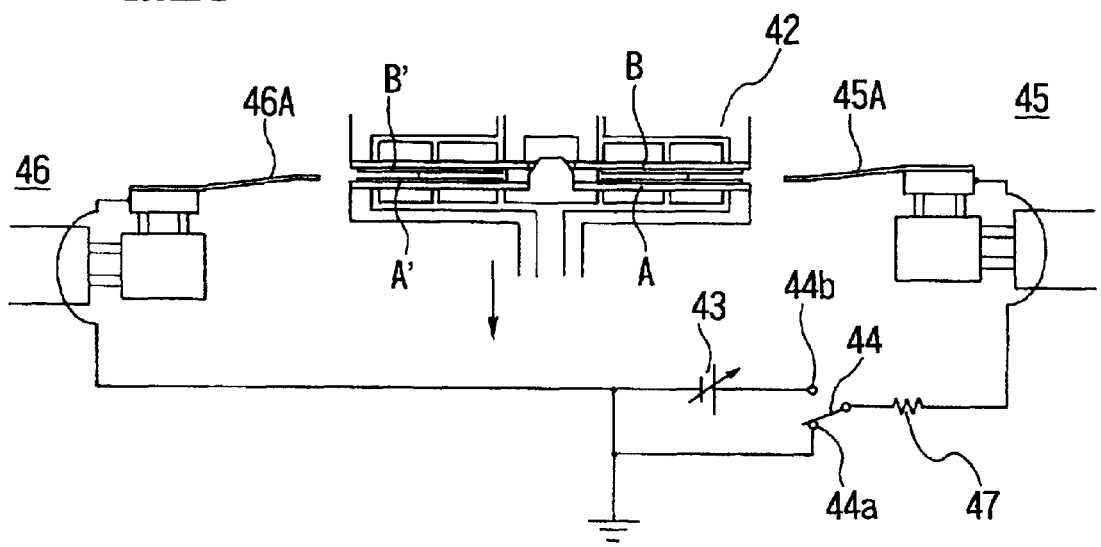
FIG. 29 is a view showing the bonding system of FIG. 23 at a seventh stage.

Thereafter, as shown in FIGS. 28 and 29, the voltage applying mechanism 45 and the low voltage connecting mechanism 46 are operated in the following manner. First, the bonding system moves the conductors 45A and 46B apart, respectively, from the reflective films A' and B1 by operating the vertical drive cylinders 45C and 46C for a short time, and then withdraws the conductors 45A and 46A from the interspace between the lower and upper discs A and B, to the original positions by operating the horizontal drive cylinders 45D and 46D. Then, the bonding system decreases the vertical distance between the lower and upper discs A and B at a very slow speed. For example, this speed is set approximately equal to a descending speed due to the gravitational force acting on the disc B and a negative pressure caused by wetting between the upper and lower adhesive layers. Thus, the bonding system of this example separates the conductor 45A from the reflective film A' after the reduction of the voltage between the conductors 45A and 46A almost to zero. Therefore, this system can prevent an electric discharge between the conductor 45A and the reflective film A' and thereby protect the lower and upper discs from damage.

The conductor 45A might scratch the conductive reflective film A' when touching. Therefore, the voltage applying mechanism 45 may be arranged to touch the conductive reflective film A' with the conductor 45A at a contact point in an outer peripheral zone under which there is no information recording area. However, such an outer peripheral zone is so narrow and irregular that it is very difficult to correctly touch the outer peripheral zone of the reflective film. In general, the information recording area is accurately concentric with the disc, but the conductive reflective film is more or less eccentric because of irregularity in manufacturing process. The distance between the edge of the conductive reflective film and the edge of the disc is small and irregular. Moreover, the outer peripheral zone of the reflective film locating outside the outer periphery of the recording area is very narrow. Even in the exact concentric arrangement, the width of the outer peripheral zone of the reflective film is equal to or smaller than 2 mm (the radius of a disc is 60 mm, and the radius of an information recording area is 58 mm according to standards).

To overcome this difficulty, the bonding system according to the fourth embodiment may have three or more conductors 45A arranged substantially at regular intervals around the disc. In this case, the positions of the conductors 45 are adjusted so that the tips of the conductors 45A for contacting with the disc are arranged in an imaginary circle which is concentric with the information recoding layer of the disc, and which is greater in diameter than the information recording area and smaller in diameter than the conductive reflective film. With this arrangement, the conductors 45A can touch the conductive reflective film outside the recording area even when the conductive reflective film is formed more or less off-center. The low voltage connecting mechanism may be constructed to have three or more conductors 46A arranged in the same manner.

It is optional to omit the switch 44 and instead employ, as the power source 43, a controllable power source capable of providing a dc output voltage having a desired pulse width (or pulse duration), as in the preceding embodiments.

Moreover, it is optional to employ a dc power source for selectively applying a negative voltage to the low voltage connecting mechanism 46 and a switch, which are connected between the ground and the low voltage connecting mechanism 46. In this case, the power source 43 applies a positive voltage to the conductive reflective film A' of the lower disc A, whereas the second power source applies a negative voltage to the conductive reflective film B' of the upper disc B. As these power source, it is convenient to employ a device capable of varying the magnitude of the output voltage and the duty cycle. In general, the power source 43 is in the form of a commercial ac power source and a rectifier. In this case, the power source 43 may further include a chopper circuit connected on the output side of the rectifier and arranged to intermittently apply a dc voltage having a frequency higher than a commercial frequency.

Figure 31:
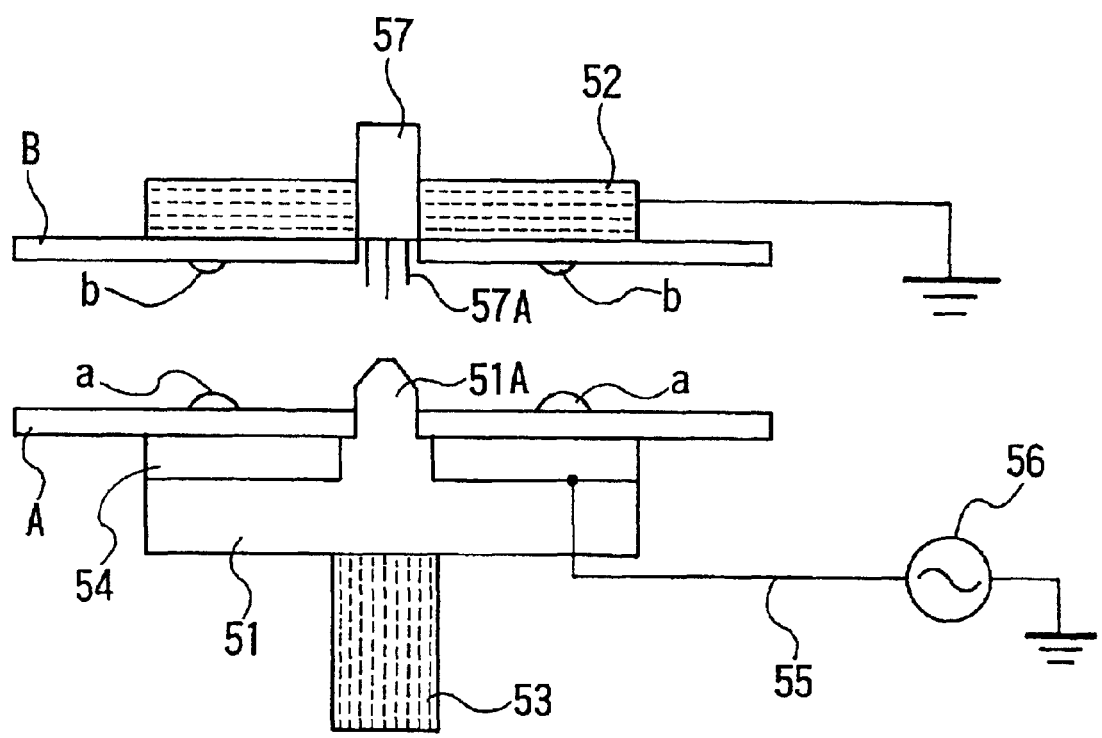
FIG. 31 is a schematic view showing a bonding system according to a fifth embodiment of the present invention.
Figure 32:
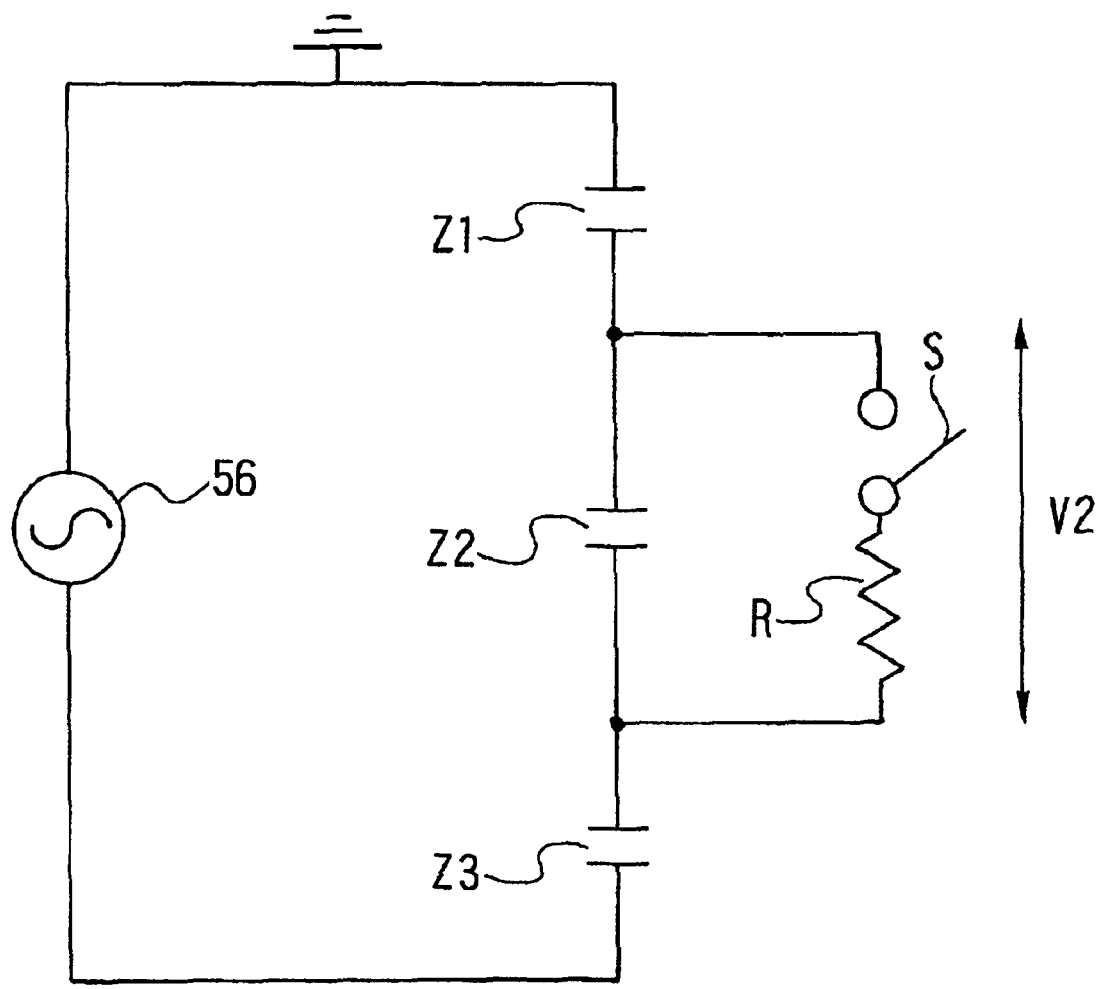
FIG. 32 is a diagram showing a circuit of the disc bonding system of FIG. 31.

FIGS. 31 and 32 show a fifth embodiment according to the present invention. In the fifth embodiment, an alternating voltage is applied between first and second substrate plates, instead of a dc voltage.

In the bonding operation, it is generally difficult to hold first and second discs A and B in parallel to each other to a sufficient degree, and to make uniform the sizes and heights of adhesive layers a and b specifically in the case of a dotted adhesive layer. Therefore, as viewed microscopically for a brief time in the contact, the adhesive layers a and b come into contact with each other at a plurality of positions at respective different instants.

In the case of dc voltage application, the first contact region can gain sufficient effect from the voltage application, and improve the wettability. However, the subsequent contact regions between the adhesive layers cannot improve the wettability as compared with the first contact region. From the instant at which the adhesive layers a and b first come into contact with each other in the first contact region, the discharge of charge stored in the capacitance between the upper and lower discs begins through the resistance R of the adhesive, and the voltage between the upper and lower substrate discs decreases. Consequently, the effect of the voltage application is more or less weakened to the subsequent contact regions.

The use of an alternating voltage in place of a dc voltage is advantageous in solving such a problem.

A first electrode 54 of a first electrode member 51 shown in FIG. 31 forms a first capacitance C1 with the reflective film A' of a lower substrate disc A insulated from the first electrode 51 by a dielectric layer of the lower disc A, and provides an impedance Z1 in the ac circuit. The interspace between the reflective films A' and B' of the lower and upper discs A and B form a capacitance C2, and provide an impedance Z2. The dielectric layer of the upper disc B forms a capacitance C3 between the second electrode 52 and the reflective film B' of the upper disc B, and provides an impedance Z3. In FIG. 32, a switch S represents the interspace between the reflective films A' and B', and R represents the resistance of the adhesive. The switch S and the resistance R are connected in series, and this series combination is connected in parallel with the second impedance Z2.

The magnitude of each of these impedances Z1, Z2 and Z3 decreases in accordance with the frequency f of the applied voltage. (For example, the absolute values of Z1 and Z3 are given by; $Z1=\frac{1}{2\pi fC1}$, $Z3=\frac{1}{2\pi fC3}$.) Therefore, it is possible to decrease the impedances Z1, Z2 and Z3 by applying an alternating voltage of an adequate frequency. By setting the frequency f at such a value as to make the value of each impedance Z1, Z2 and Z3 approximately equal to or lower than the resistance R of the adhesive, it is possible to achieve the system such that the voltage V2 between the reflective films A' and B' of the discs A and B receives no or little influence from the resistance R.

Therefore, in the bonding system employing an ac power source 56 as shown in FIG. 31 having an adequately set frequency f, the voltage V2 is hardly decreased by contact between the adhesive layers a and b. That is, this bonding system can maintain the effect of the voltage application, even after the first contact, for the subsequent contact regions.

In view of the thicknesses of the discs A and B, the dielectric constants, the resistivity of the adhesive and other conditions, the voltage application is effective when the frequency f of the alternating voltage is equal to or higher than 4 kHz. However, in consideration of the audible frequency range, it is preferable to set the frequency f of the alternating voltage of the ac power source 56 equal to or higher than 20 kHz.

In the case of alternating voltage, the effect of the voltage application is influenced by the average value, so that the ground is established with the average value. It is possible to employ various waveforms for the alternating voltage alternating to the positive and negative sides. For example, the waveform of the alternating voltage may be sinusoidal, rectangular, triangular, sawtooth or in the shape having a voltage off period.

FIG. 33 show a bonding system including all of an adhesive supplying section (101, 102), an overlapping or superposing section 103 for superposing first and second substrate plates with the interposition of adhesive, an adhesive spreading section 104 for spreading the adhesive sandwiched between the first and second substrate plates by leaving, compressing, spinning or some other way, and a curing section 105 for curing the adhesive film sandwiched between the first and second substrate plates. There is further provided a field producing section or circuit 106 for producing an electric field in the interspace between the first and second substrate plates by the application of a voltage in the process of the superposition in the superposing section 103. The adhesive supplying section may include a first device 101 for supplying the adhesive on the first substrate plate or disc, and a second device for supplying the adhesive on the second substrate plate or disc. The adhesive supplied on at least one of the first and second substrate plates may be in the form of dots or drops. Each bonding system in the preceding embodiments can be constructed to includes all these sections.

Although the invention has been described above with reference to the illustrated embodiments, the present invention is not limited to the embodiments described above. Modifications and variations of the embodiment will occur to those skilled in the art in light of the above teachings.

What is claimed is:

1. A plate bonding method for producing a bonded plate having an adhesive film sandwiched between first and second plates, the bonding method comprising: an adhesive supplying step of supplying adhesive on at least one of the first and second plates; an overlapping step of overlapping the first and second plates by bringing the first and second plates closer to each other with the adhesive in between to produce the bonded plate; and an electric field producing step of producing an electric field in an interspace between the first and second plates during a period in the overlapping step.

2. A plate bonding method according to claim 1 wherein the bonding method further comprises a spreading step of spreading the adhesive between the first and second plate after the overlapping step.

3. A plate bonding method according to claim 2 wherein the spreading step includes one of an operation for leaving the first and second plates one on the other with the adhesive sandwiched between the first and second plates, an operation of compressing the first and second plates with the adhesive sandwiched therebetween, and an operation of spinning the first and second plates with the adhesive sandwiched therebetween.

4. A plate bonding method according to claim 1 wherein the adhesive supplying step comprises a first operation of forming a dotted adhesive layer on one of the first and second plates, the dotted adhesive layer including dot regions of the adhesive which are separate from one another.

5. A plate bonding method according to claim 4 wherein the dot regions formed, by the first operation of the adhesive supplying step are arranged in an imaginary circle on the second plate, and the adhesive supplying step further comprises a second operation of forming an annular adhesive layer on the first plate.

6. A plate bonding method according to claim 1 wherein the adhesive supplying step comprises an operation of forming an annular adhesive layer on one of the first and second plates.

7. A plate bonding method according to claim 1 wherein, in the electric field producing step, the electric field is produced locally in a pattern conforming to a pattern of the adhesive formed on one of the first and second plates.

8. A plate bonding method according to claim 1 wherein the adhesive supplying step comprises an operation of forming an annular adhesive layer on the first plate which is a first substrate disc and forming a dotted adhesive layer on the second plate which is a second substrate disc, the electric field producing step comprises a first sub-step of applying a voltage between a first electrode for the first substrate disc and a second electrode for the second substrate disc, a second sub-step of reducing the voltage between the first and second electrode to a value lower than a predetermined level, and a third sub-step of removing the first and second electrodes, respectively, from the first and second substrate discs after the second sub-step.

9. A plate bonding method according to claim 1 wherein the electric field producing step includes an operation of putting first and second conductors, respectively, in contact with confronting surfaces of the first and second plates to apply a voltage between the first and second conductors during a predetermined period in the operation of bringing the first and second plates closer together in a confronted state in which the confronting surfaces of the first and second plates confront each other.

10. A plate bonding method according to claim 1 wherein the first plate is a first substrate disc having a reflective film, the second plate is a second substrate disc having a reflective film, the bonded plate is an optical disc, and the electric field producing step includes an operation of directly applying a voltage between the reflective films of the first and second substrate discs when contact is established between the reflective films through the adhesive.

11. A plate bonding method according to claim 10 wherein the adhesive supplying step comprises an operation of forming a dotted adhesive layer on one of the first and second substrate discs, the dotted adhesive layer including dot regions of the adhesive which are separate from one another, and the application of the voltage between the reflective films of the first and second substrate discs in the electric field producing step is started when none of the dot regions are connected between the reflective films, and ended after all the dot regions of the dotted adhesive layer are connected between the reflective films.

12. A plate bonding method according to claim 1 wherein the electric field producing step comprises an operation of applying an alternating voltage between the first and second plates.

13. A plate bonding method according to claim 1 wherein the electric field producing step comprises an operation of applying a dc voltage between the first and second plates.

14. A disc bonding method for producing a bonded optical disc having an adhesive film sandwiched between first and second discs, the bonding method comprising:

an adhesive supplying step of supplying adhesive on at least one of the first and second discs;

an overlapping step of overlapping the first and second discs by bringing the first and second discs closer to each other with the adhesive in between, to produce the bonded optical disc; and an electric field producing step of producing an electric field in an interspace between the first and second discs, during a period in the overlapping step, to deform the adhesive into a tapered form with a force of the electric field to reduce an initial contact area, and thereby to prevent voids from being formed between the first and second discs.

* * * * *